(12) United States Patent
Sajikawa et al.

(10) Patent No.: US 6,731,610 B2
(45) Date of Patent: May 4, 2004

(54) DATA COMMUNICATION SYSTEM AND APPARATUS

(75) Inventors: Yasuyuki Sajikawa, Fukuoka (JP); Hidetada Tanaka, Fukuoka (JP); Hikaru Udou, Fukuoka (JP); Kensuke Kubo, Fukuoka (JP); Kazuhisa Matsumoto, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/046,353

(22) Filed: Mar. 23, 1998

(65) Prior Publication Data

US 2003/0053479 A1 Mar. 20, 2003

(30) Foreign Application Priority Data

Oct. 14, 1997 (JP) .............................................. 9-295012

(51) Int. Cl.[7] .......................... H04L 12/16; H04L 12/28; H04L 12/56; H04Q 11/00; H04J 3/02

(52) U.S. Cl. ........................ 370/266; 370/390; 370/537

(58) Field of Search ................................. 370/260, 266, 370/267, 345, 442, 458, 535, 537, 540, 542, 544, 263, 265, 389, 390, 428, 498, 503; 379/45, 37, 51

(56) References Cited

U.S. PATENT DOCUMENTS

| | | | |
|---|---|---|---|
| 4,076,966 A | * | 2/1978 | Bovo et al. .................. 379/202 |
| 4,293,946 A | * | 10/1981 | Kuras et al. ................. 370/263 |
| 4,932,024 A | * | 6/1990 | Bonicioli et al. ............ 370/458 |
| 5,016,159 A | * | 5/1991 | Maruyama ................... 370/390 |
| 5,239,570 A | * | 8/1993 | Koster et al. .................. 379/45 |
| 5,249,223 A | * | 9/1993 | Vanacore ..................... 379/221 |
| 5,311,569 A | * | 5/1994 | Brozovich et al. ............. 379/45 |
| 5,646,987 A | * | 7/1997 | Gerber et al. ................ 379/265 |

FOREIGN PATENT DOCUMENTS

JP       62 2263655       10/1987

* cited by examiner

*Primary Examiner*—Dang Ton
*Assistant Examiner*—Kevin C. Harper
(74) *Attorney, Agent, or Firm*—Katten Muchin Zavis Rosenman

(57) ABSTRACT

A data communication system includes a plurality of terminal apparatuses #1–#n for periodically transmitting data and retrieving desired data accommodated in at least one time slot in received multiplex data, and a data storage and distribution apparatus for subjecting received data from the plurality of terminal apparatuses to time division multiplexing so as to produce time slots each corresponding to a respective one of the plurality of terminal apparatuses, reproducing resultant multiplex data, and distributing the multiplex data to the plurality of terminal apparatuses.

10 Claims, 24 Drawing Sheets

FIG. 2

| | | UNUSED | CALL ORIGINATION | CALL PROCEEDING | RE-RING SIGNAL | DISCONNECTION |
|---|---|---|---|---|---|---|
| FIRE-FIGHTING DC | FIRE-FIGHTING CENTER FPI — LINE A | NO POTENTIAL | NO POTENTIAL | GROUND | -48V | NO POTENTIAL |
| | LINE B | GROUND | GROUND | GROUND | GROUND | NO POTENTIAL |
| | NTT PTT — LINE A | NO POTENTIAL | -48V | -48V | GROUND | -48V |
| | LINE B | NO POTENTIAL | -48V | -48V | -48V | -48V |
| POLICE DC | POLICE HEADQUARTERS FPI — LINE A | GROUND | GROUND | GROUND | NO POTENTIAL | NO POTENTIAL |
| | LINE B | NO POTENTIAL | NO POTENTIAL | GROUND | GROUND | NO POTENTIAL |
| | NTT PTT — LINE A | NO POTENTIAL | -48V | -48V | -48V | -48V |
| | LINE B | NO POTENTIAL | -48V | -48V | -48V | -48V |
| FIRE-FIGHTING/POLICE AC | FIRE-FIGHTING CENTER/POLICE HEADQUARTERS FPI — LINE A | NO POTENTIAL | NO POTENTIAL | LOOP | GROUND | NO POTENTIAL |
| | LINE B | NO POTENTIAL | NO POTENTIAL | LOOP | GROUND | NO POTENTIAL |
| | NTT PTT — LINE A | NO POTENTIAL | -48V 16Hz | -48V | -48V | -48V |
| | LINE B | NO POTENTIAL | GROUND | GROUND | GROUND | GROUND |

FIG. 11A

| RACK 1 | 2 | 3 | 4 | 5 | 6 | 7 |
|---|---|---|---|---|---|---|
| LT<br>NW00<br>HW08 | LT<br>NW00<br>HW24 | LT<br>NW01<br>HW16 | LT (CONSOLE)<br>NW02<br>HW00 | LT (CONSOLE)<br>NW02<br>HW20 | LT (CONSOLE)<br>NW03<br>HW12 | LT<br>NW<br>HW |
| LT<br>NW00<br>HW04 | LT<br>NW00<br>HW20 | LT<br>NW01<br>HW12 | LT (CONSOLE)<br>NW01<br>HW28 | LT (CONSOLE)<br>NW02<br>HW16 | LT (CONSOLE)<br>NW03<br>HW18 | LT<br>NW03<br>HW28 |
| CC | LT<br>NW00<br>HW08 | LT<br>NW01<br>HW24 | LT (CONSOLE)<br>NW01<br>HW24 | LT (CONSOLE)<br>NW02<br>HW12 | LT (CONSOLE)<br>NW03<br>HW04 | LT<br>NW03<br>HW24 |
| CC | LT<br>NW00<br>HW04 | LT<br>NW01<br>HW04 | LT<br>NW01<br>HW20 | LT (CONSOLE)<br>NW02<br>HW08 | LT (CONSOLE)<br>NW03<br>HW00 | LT<br>NW03<br>HW20 |
| LT<br>NW00<br>HW00 | CPNW | LT<br>NW01<br>HW00 | CPNW | LT (CONSOLE)<br>NW02<br>HW04 | LT (CONSOLE)<br>NW02<br>HW24 | LT (CONSOLE)<br>NW03<br>HW16 |

FIG. 11B

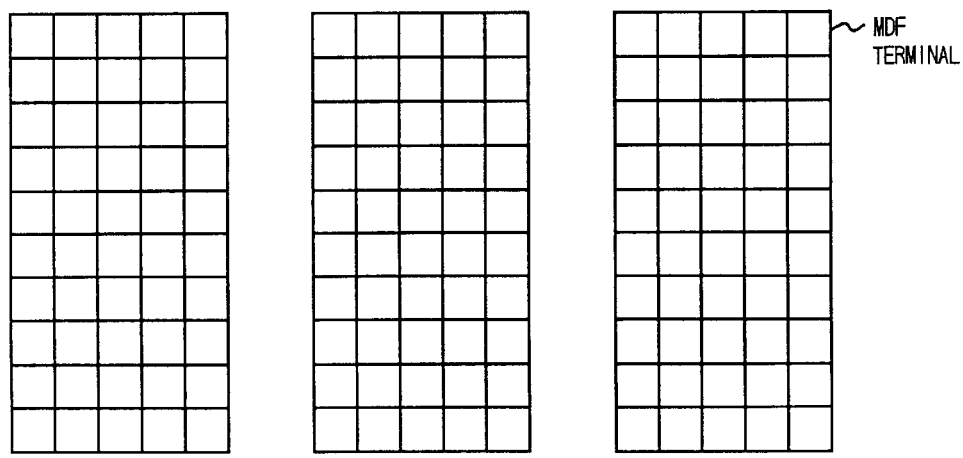

MDF TERMINAL

FIG. 15

FPI INFORMATION AREA

| BIT | 7 | 6 | 5 | 4 | 3 | 2 | 1 | 0 | |
|---|---|---|---|---|---|---|---|---|---|
| ROW00 | ② | ① EMERGENCY REPORT LINE STATUS | | | | | UNUSED | UNUSED | ⎫ LINE 0<br>⎬ SD (FPI → RECEPTION CONSOLE)<br>⎪<br>⎪ ① NOTIFICATION TO RECEPTION CONSOLE : 5 BITS<br>⎪   (UNUSED, CALL INCOMING, HOLDBACK, RE-RING,<br>⎪   DISCONNECTION BY REPORTER)<br>⎪ ② NORMALITY VERIFICATION : ONE BIT (ALTERNATELY ON/OFF)<br>⎭ ③ CHECKSUM : 8 BITS |
| 01 | UNUSED | UNUSED | UNUSED | UNUSED | UNUSED | UNUSED | UNUSED | UNUSED | |
| : | | | | | | | | | |
| : | | | | | | | | | |
| 07 | | | | ③ CHECKSUM AREA | | | | | |
| 08 | ② | ① EMERGENCY REPORT LINE STATUS | | | | | UNUSED | UNUSED | ⎫ LINE 1<br>⎬ SD |
| 09 | UNUSED | UNUSED | UNUSED | UNUSED | UNUSED | UNUSED | UNUSED | UNUSED | |
| : | | | | | | | | | |
| : | | | | | | | | | |
| 15 | | | | ③ CHECKSUM AREA | | | | | |
| 16 | ② | ① EMERGENCY REPORT LINE STATUS | | | | | UNUSED | UNUSED | ⎫ LINE 2<br>⎬ SD |
| 17 | UNUSED | UNUSED | UNUSED | UNUSED | UNUSED | UNUSED | UNUSED | UNUSED | |
| : | | | | | | | | | |
| : | | | | | | | | | |
| 23 | | | | ③ CHECKSUM AREA | | | | | |
| 24 | ② | ① EMERGENCY REPORT LINE STATUS | | | | | UNUSED | UNUSED | ⎫ LINE 3<br>⎬ SD |
| 25 | UNUSED | UNUSED | UNUSED | UNUSED | UNUSED | UNUSED | UNUSED | UNUSED | |
| : | | | | | | | | | |
| : | | | | | | | | | |
| 31 | | | | ③ CHECKSUM AREA | | | | | |

FIG. 16

RECEPTION CONSOLE INFORMATION AREA

| | BIT 7 | 6 | 5 | 4 | 3 | 2 | 1 | 0 |
|---|---|---|---|---|---|---|---|---|
| ROW 00 | ② | ① RECEPTION CONSOLE STATUS INFORMATION NOTIFICATION | | | | | | |
| 01 | UNUSED | UNUSED | UNUSED | UNUSED | UNUSED | UNUSED | UNUSED | UNUSED |
| 02 | | | | ④ | | | | |
| 03 | | | | ④ | | | | ③ |
| 04 | UNUSED | UNUSED | UNUSED | UNUSED | UNUSED | UNUSED | | |
| 05 | ⑤ CHECKSUM AREA | | | | | | | |
| 06 | UNUSED | UNUSED | UNUSED | UNUSED | UNUSED | UNUSED | UNUSED | UNUSED |
| .. | | | | | | | | |
| .. | | | | | | | | |
| .. | | | | | | | | |
| .. | | | | | | | | |
| .. | | | | | | | | |
| .. | | | | | | | | |
| .. | | | | | | | | |
| .. | | | | | | | | |
| 31 | UNUSED | UNUSED | UNUSED | UNUSED | UNUSED | UNUSED | UNUSED | UNUSED |

SD (LOCAL → REMOTE RECEPTION CONSOLE)
/SCAN (REMOTE RECEPTION CONSOLE → LOCAL)

① RECEPTION CONSOLE STATUS NOTIFICATION : 7 BITS
  (NOT ATTENDED, UNUSED, CALL PROCEEDING,
  COMMAND PROCEEDING, RADIO COMMUNICATION PROCEEDING, CALL INCOMING,
  HOLDBACK)
② NORMALITY VERIFICATION : 1 BIT
  (ALTERNATELY ON/OFF)
③ TRIPARTITE/MANIPULATOR : 2 BITS
  (MANIPULATOR INTERRUPTION BY INTER-CONSOLE MONITORING BUTTON IS
  DISABLED)
④ INTERRUPTION REQUEST PATTERN : 16 BITS
  (RECEPTION CONSOLE TO WHICH INTERRUPTION REQUEST IS DESTINED)
⑤ CHECKSUM : 8 BITS

FIG. 18

LINE 0
SD (RLT → RECEPTION CONSOLE)
① PRESSED : 1 BIT
② SQUELCH OFF : 1 BIT
③ CALL INCOMING : 1 BIT
④ COMMAND PROCEEDING : 1 BIT
⑤ IN USE : 1 BIT
⑥ RECEIVED AT BASE STATION WITH MAXIMUM RECEPTION LEVEL : 3 BITS
⑦ STATUS CHANGE NOTIFICATION : 1 BIT
⑧ CHECKSUM : 8 BITS

LINE 0
SCAN (RECEPTION CONSOLE → RLT)
① OR OF "PRESSED" BITS FROM ALL CONSOLES : 1 BIT
② OR OF "SQUELCH" BITS FROM ALL CONSOLES : 1 BIT
③ OR OF FIRE STATION CH ACTIVATION BITS FROM ALL CONSOLES : 1 BIT
④ OR OF "FREE" BITS FROM ALL CONSOLES : 1 BIT
⑤ "PRESSED" BITS OF CONSOLES
  (IN CASE OF ORIGINATION FROM PLURAL CONSOLES) : 16 BITS
  {1 BIT×16 CONSOLES}
  FIRE STATION CH ACTIVATION
  (IN CASE ORIGINATION FROM PLURAL CONSOLES DOES NOT OCCUR) :
  16 BITS (1×16)
⑥ BASE STATION DESIGNATION : 48 BITS (3×16)

LINE 1
SCAN

LINE 1
SD

RLT INFORMATION AREA

| | BIT 7 | 6 | 5 | 4 | 3 | 2 | 1 | 0 |
|---|---|---|---|---|---|---|---|---|
| ROW00 | UNUSED | ⑧ | UNUSED | ⑤ | ④ | ③ | ② | ① |
| 01 | | | ⑦ | | | | ⑥ | |
| 02 | ⑨ CHECKSUM AREA | | | | | | | |
| 03 | UNUSED | UNUSED | UNUSED | UNUSED | ④ | ③ | ② | ① |
| 04 | | ⑤ | ⑤ | ⑤ | ⑤ | ⑤ | ⑤ | ⑤ |
| 05 | | ⑤ | ⑤ | ⑤ | ⑤ | ⑤ | ⑤ | ⑤ |
| 06 | UNUSED | UNUSED | ⑥ CONSOLE #2 | | | ⑥ CONSOLE #1 | | |
| 07 | UNUSED | UNUSED | ⑥ CONSOLE #4 | | | ⑥ CONSOLE #3 | | |
| ⋮ | | | | | | | | |
| 15 | UNUSED | | | | UNUSED | | | |
| 16 | UNUSED | ⑧ | UNUSED | ⑤ | ④ | ③ | ② | ① |
| 17 | | | ⑦ | | | | ⑥ | |
| 18 | ⑨ CHECKSUM AREA | | | | | | | |
| 19 | UNUSED | UNUSED | UNUSED | UNUSED | ④ | ③ | ② | ① |
| 20 | | ⑤ | ⑤ | ⑤ | ⑤ | ⑤ | ⑤ | ⑤ |
| 21 | | ⑤ | ⑤ | ⑤ | ⑤ | ⑤ | ⑤ | ⑤ |
| 22 | UNUSED | UNUSED | ⑥ CONSOLE #2 | | | ⑥ CONSOLE #1 | | |
| 23 | UNUSED | UNUSED | ⑥ CONSOLE #4 | | | ⑥ CONSOLE #3 | | |
| ⋮ | | | | | | | | |
| 31 | UNUSED | | | | UNUSED | | ⑥ | |

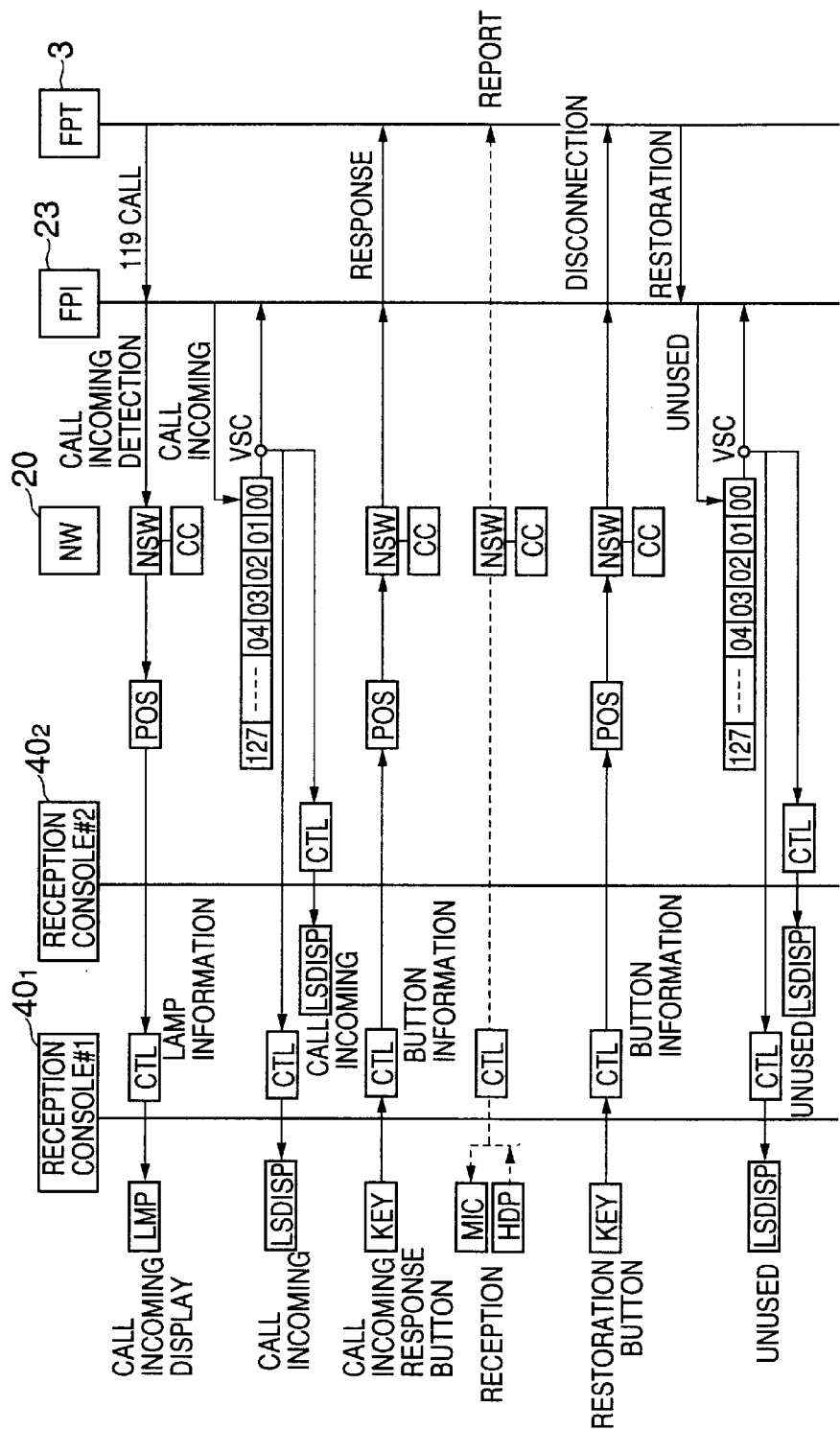

DATA COMMUNICATION SYSTEM AND APPARATUS

BACKGROUND OF THE INVENTION

1. Field of the Invention

The present invention generally relates to data communication systems and apparatuses and, more particularly, to a data communication system and apparatus for performing sound and information data communication between a plurality of apparatuses (terminal equipment, line connection apparatuses).

As an example of a communication system of this kind, there is known an emergency report system for implementing 119/110 call reception from a subscriber, inter-console monitoring/interruption, fire station/police substation command origination, and radio communication with a dispatched automobile (ambulance, fire engine, police car and the like), 119 being a number dialed in Japan to call a fire station, and 110 being a number dialed to call a police station. Emergency 119/110 call reception from a subscriber, inter-console monitoring/interruption, fire station/police substation command origination, radio communication with a dispatched automobile are major facilities provided in a fire fighting center and police headquarters. In an emergency report system, plural apparatuses (public network switches, report reception consoles, command receiver apparatuses in a fire station/police substation, remote radio base station apparatuses) connect to each other via a switch (PBX) provided in a fire fighting center or the police headquarters and perform communication of sound and information data. Because such an emergency report system is socially important, the quality of high-speed (particularly, reduction of time required to transmit a command), reduction of system size, reduction of time required for delivery, and reduction in cost are demanded by customers, to say nothing of high-quality, high-reliability communication service.

2. Description of the Related Art

FIG. 1A is a schematic diagram showing a construction of an emergency report system according to the related art. Referring to FIG. 1A, the emergency report system comprises a subscriber telephone (TEL) 1, a public (NTT) network 100, a line circuit (LC) 2, a switch (NW) 70 of the NTT network, an emergency report trunk (FPT) 3, a fire fighting center/the police headquarters 200/300, a reception console 40 of emergency reports, a switch (NW) 20 of the fire fighting center/the police headquarters, an emergency report reception trunk (FPI) 23, a command line trunk (LDS) 24, a fire station/police substation 201/301, and a command receiver apparatus 60.

When a subscriber dials 119 using the TEL 1, the call arrives at the switch 20 of the fire fighting center 200 via the switch 70 of the NTT network and the emergency report line, and is accepted by the report reception console 40. The receiver of the report gives a command to a related (near the origination of the report) fire station 201. The command is sent to the command receiver apparatus 60 of the related fire station 201 via the switch 20 and the command line. The command receiver who heard the command dispatches a vehicle (an ambulance, a fire engine or the like) according to the command, so that the subscriber can benefit from timely emergency service for an illness or disaster.

When a subscriber calls 110 using the TEL 1, the call arrives at the switch 20 of the police headquarters 300 via the switch 70 of the NTT network and the emergency report line, and is accepted by the report reception console 40. The receiver of the report gives a command to a related (near the origination of the report) police substation 301. The command is sent to the command receiver apparatus 60 of the related police substation 301 via the switch 20 and the command line. The command receiver who heard the command dispatches a police car or a policeman to the spot according to the command, so that the subscriber can benefit from timely emergency service for a problem or accident. After the dispatch, communication between the vehicles and the reception console 40 is performed through a radio circuit (not shown).

FIG. 1B is a perspective view showing the report reception console. Referring to a FIG. 1B, the report reception console has a line status display unit (LSDISP) 51 for performing realtime display of a line status (unused, call incoming, call proceeding, holdback etc.) of the emergency report line, the command line and the radio circuit; an operation unit 55 for displaying information indicating an emergency call incoming and for performing a call incoming reply operation (button operation); display lamps (LMP) 43, and operation buttons (KEY). Some of the operation buttons 44 are arranged to form a pair with respective display lamps 43 so that a button operation corresponding to the lamp display can be performed quickly. The report reception console further comprises a headset or a handset (HS) used by a reception console manipulator for a call, and a monitor speaker (MSP) for monitoring a radio call sound as it arrives from a radio-equipped vehicle (fire engine, police car or the like).

FIG. 2 shows a signaling system of the emergency report line according to the related art.

Referring to columns of FIG. 2, DC indicates a DC line, and AC indicates an AC line (ringing tone at 16 Hz or the like). The line status of FPT 3 (unused, call originating, call proceeding, a re-ring signal, disconnection) is listed in horizontal columns. For example, in a state where the fire-fighting center DC line is "unused", line A and line B of FPT 3 are connected to a zero potential (open), and line A of FPI 23 is connected to a zero potential (open) and line B thereof is connected to the ground via a constant resistance. When FPT 3 originates a call by connecting both line A and line B to −48 V, an electric current flows in line B of the FPI 23 so that the call origination by the FPT 3 is detected (that is, a call incoming from the emergency report line is received). Other aspects of the operation proceed similarly.

While the description below mainly concerns the emergency report system involving the fire fighting center, it can also be applied to the emergency report system involving the police headquarters.

FIG. 3 shows a construction of the emergency report system according to the related art.

The emergency report system according to the related art uses the line switching facilities of the switch 20 (a call path switch 22, a call control unit 21), to connect calls between a subscriber, a reception console, a command receiver apparatus, and a radio-equipped vehicle. A detailed description will be given below.

Referring to FIG. 3, the emergency report system comprises the switch main body (NW) 20 of the fire fighting center, reception consoles $40_1$–$40_n$ for performing 119 call reception, inter-console monitoring/interruption, origination of a command to a related station, radio communication with radio-equipped vehicles, command receiver apparatuses $60_1$–$60_m$ provided in each station, and radio apparatuses (RFU) $4_1$–$4_k$ for performing radio communication with dispatched vehicles MS.

The switch main body NW 20 comprises the call control unit (CC) 21 for controlling major facilities (call processing and the like) of the switch main body, the call path switch (NSW) 22 for switching sound and information data, the emergency report reception trunk (FPI) 23 connected to an emergency report line, the command line trunk (LDS) 24 connected to the command receiver apparatus 60, a radio circuit trunk (RLT) 25 connected to RFU 4, a reception console connection package (ATT) 26 connected to the reception console 40, an inter-console monitoring connection package (OTL) 27 for controlling sound monitoring/interruption connection between the reception consoles, and a radio apparatus connection control package (DMC) 28 for connecting the reception console 40 to RFU 4.

The reception console 40 comprises a reception console control package (CTL) 41 for controlling major facilities of the reception console, a lamp/button information processing unit (CBA) 42 for processing lamp information and button information, the reception console operation unit 55, a lamp information display unit (LMP) 43 embodied by an LED or the like, a button operation unit (KEY) 44, a lamp driver (SDA) 45 for lighting an LED that corresponds to lamp information, a button operation discrimination unit (SCA) 46 for discriminating depression of a button and sending button information to CBA42. The reception console 40 provides a sound process unit (SPA) 47 for processing a sound signal, a head set 48 or a hand set (HS) that the reception console manipulator uses, a microphone MIC, a headphone HDP, a call path control package (SPC) 49 for connecting sound between SPA47 and ATT26 and for performing switching control of the call path connected to OTL27 and DMC28, an inter-console monitoring/radio activation package (IFC) 50 for sending an activation signal to OTL27 and DMC28 and for detecting a reply signal, the line status display unit (LSDISP) 51 for displaying line status of the emergency report line, the command line, and the radio circuit on the front panel, and a monitor speaker (MSP) 52 for outputting a radio call sound from the radio-equipped vehicle MS.

A description will now be given of the facilities provided in the reception console. FPI 23 is provided with facilities for detecting a 119 call incoming and notifying the reception console 40 accordingly, facilities for placing a re-ring call from the reception console 40 via the emergency report line (an operation whereby the reception console 40 makes a call using a ringing tone when a subscriber terminates a call), facilities for sending a disconnection signal to the emergency report line in response to a restoration operation of the reception console 40, and facilities for displaying the status of the emergency report line on LSDISP 51 of the reception console 40.

Status information of the emergency report line is sent via a metallic information line 81 to an MDF (Main Distributing Frame), and is distributed to each LSDISP 51 of the reception consoles $40_1$–$40_n$ by multiple-connection from the MDF, so that all the reception consoles $40_1$–$40_n$ can monitor the status of the emergency report line in realtime. The status of the emergency report line is displayed as follows:

unused: unlighted;
call incoming: 120INT (blinking);
call proceeding: continuously lighted
holdback: 60INT.

LDS 24 is provided with facilities whereby it is captured via NSW 22 in response to an operation in the reception console, so as to send an activation signal (a ringing tone) to the command receiver apparatus 60, facilities for detecting a reply (a loop) from the command receiver apparatus 60, and sending reply information to the reception console 40, facilities for sending command sound from the reception console 40 to the command receiver apparatus 60, and facilities for displaying a status of the command line on the LSDISP 51 of the reception console 40.

Status information of the command line is distributed to each LSDISP 51 of the reception consoles $40_1$–$40_n$ via the metallic information line 81 and MDF, so that all the reception consoles $40_1$–$40_n$ can monitor a status of all the command lines in realtime. The status of the command line is displayed as follows:

unused: unlighted;
calling: 120INT;
command proceeding: continuously lighted

RLT 25 is provided with facilities whereby it is captured via NSW 22 in response to an operation in the reception console, so as to call a radio-equipped vehicle, facilities for notifying the reception console 40 of a call incoming via RFU4, and facilities for displaying a status of the radio circuit on LSDISP 51 of the reception console 40.

Status information of the radio circuit is distributed to each LSDISP 51 of the reception consoles $40_1$–$40_n$ via the metallic information line 81 and MDF, so that all the reception consoles $40_1$–$40_n$ can monitor a status of all the radio circuits in realtime. The status of the radio circuit is displayed as follows:

unused: unlighted;
call incoming: 120INT;
call proceeding: continuously lighted

RLT25 is further provided with facilities for sending a radio call sound from a radio-equipped vehicle MS to MSP 52 of the reception console 40. Radio call sound is sent via a metallic information line 82 to MDF, and is distributed to each MSP 52 of the reception consoles $40_1$–$40_n$ by multiple-connection from MDF, so that all the reception consoles $40_1$–$40_n$ can monitor the radio call sound from radio-equipped vehicles.

OTL 27 implements sound monitoring/interruption connection between the reception consoles, and is provided one for each reception console to provide one call path in NSW 22. When an inter-console monitoring operation is performed at the reception console $40_n$ while a subscriber and a manipulator or operator of the reception console $40_1$ is speaking over the phone, an activation signal is sent from IFC $50_n$ to OTL $27_n$ under the control of CTL41$n$. With this, a call channel is formed with respect to SPC $49_1$ of the monitored console $40_1$ via NSW 22, so that the manipulator of the reception console $40_n$ can perform inter-console monitoring of the sound of the call via SPC $49_1$-OTL $27_1$-NSW$_{22}$-OTL $27_n$-SPC $49_n$. A detailed description will be given with reference to FIG. 7.

DMC 28 connects the reception console 40 to RFU 4. DMC 28 is provided one for each reception console to provide one call path in NSW 22. For example, when an operation of originating a call to a radio-equipped vehicle is performed in the reception console $40_1$, an activation signal is sent out from IFC $50_1$ to DMC 28 under the control of CTL $41_1$, and a call path connected to RFU 4 is formed via RLT 25, so that radio communication becomes possible. A detailed description will be given with reference to FIG. 10.

ATT 26 is provided with facilities for sending 119 call incoming information from FPI 23 and radio call incoming information from RLT 25 to the reception console 40, facilities for sending button depression information occurring in the reception console operation unit 55 to FPI 23, LDS 24, RLT 25 or the like, facilities for relaying a sound signal between these components.

CTL 41 is provided with facilities for exchanging lamp information and button depression information with ATT 26, facilities for sending activation information from IFC 50 to OTL 27/DMC 28 in inter-console monitoring/interruption and in radio call origination, and facilities for causing SPC49 to perform call path switching operation in inter-console monitoring.

FIGS. 4A and 4B show information interface between CTL 41 and ATT 26 according to the related art. As described above, lamp information indicating detection of an incoming urgent call, for example, is sent from ATT 26 to CTL 41, and, in response to that, button information indicating a call receiving operation, for example, is sent from CTL 41 to ATT 26.

FIG. 4A shows a format of the lamp information. One ROW of the lamp information comprises 8 bits, and each bit except the highest flag bit B7 corresponds to one lamp (LED) of the reception console operation unit 55. The lamp information is provided for all of the display lamps 43 of the operation unit 55. For example, the lamp information ROW0–ROWn is provided. By setting the highest bit B7 of ROW0 to 0 and setting each highest bit B7 of ROW1–ROWn to 1, the lamp information ROW0 at the head can be identified.

FIG. 4B shows a format of information data communication between CTL 41-ATT 26. Bit serial transfer of lamp information is performed from ATT 26 to CTL 41. The lamp information ROW0 is sent first. One transmitted frame of the lamp information ROW0 comprises a total of 11 bits including a start bit "ST", lamp information bits "B0–B6", a flag bit "B7", a parity bit "PA", and a stop bit "ST". The transmission time for 1 bit is 32 $\mu$s, so that the transmission time for a total of 11 bits is 352 $\mu$s.

After a pause $\alpha$ (which depends on the system), the lamp information ROW1 is sent. In this way, the lamp information ROW0–ROWn is sent, thus completing the first sequence of lamp information transmission. Similarly, the second and subsequent sequences of lamp information transmission is performed. For example, if the lamp information bit "B2" of ROW0 is always set to 1, the corresponding LED is lighted continually. If bit "B2" is continually set to 0, for example, the corresponding LED is continually extinguished. If bit "B2" is set to 1 and 0 alternately, the corresponding LED blinks.

Button information is sent from CTL 41 to ATT 26. One transmitted frame of button information comprises a total of 11 bits including a start bit "ST", code information bits "B0–B7" of the button, a parity bit "PA", a stop bit "ST". The transmission time for 1 bit is 32 $\mu$s, so that the transmission time for a total of 11 bits is 352 $\mu$s. After a pause of about 9.65 ms, altogether producing a time span of 10 ms, the second and subsequent sequences of button information transmission is performed. The code information bits "B0–B7" of the button is the information obtained by encoding the depression of the button of the operation unit 55. A maximum of 256 buttons can be distinguished from each other in this example. In this way, code information of a button is sent at a 10 ms period. While a button is being depressed, the code information is sent in succession, and, when the button is let go, the code information having all bits set to 0 is sent.

FIG. 5 shows a communication protocol of the command line according to the related art. When a command receiver apparatus activation button of the reception console operation unit 55 is depressed, LDS 24 sends an activation signal (a ringing tone) to the command receiver apparatus 60. The command receiver apparatus 60 detects the ringing tone so as to send back a reply (a loop) automatically. When LDS24 detects the loop, it sends out an activation tone. The command receiver apparatus 60 detects the activation tone so as to activate a sound amplifier. When the manipulator sends a command via LDS 24 subsequently, the command sound is output by a loud speaker of the command receiver apparatus 60 so as to be heard by a command receiver. When the command has been processed, an operation for restoration from command is performed such that a restoration tone is sent from LDS 24. The command receiver apparatus 60 detects the restoration tone so as to deactivate the sound amplifier and sends back a restoration reply (loop disconnection). Although not illustrated, a call origination operation from the command receiver apparatus 60 to the reception console 40 may also be performed.

A description will now be given of major facilities provided in the emergency report system according to the related art, including 119 call reception, inter-console monitoring/interruption, fire station command, and radio communication.

FIG. 6 shows a 119 call reception operation according to the related art.

A 119 call from the TEL 1 arrives at FPI 23 by LC 2-public network 100-FPT 3-the emergency report line ((1) of FIG. 6). When call incoming is detected on the emergency report line, FPI 23 sends out call incoming information (lamp information). The lamp information is sent to CTL 41 of the reception console 40 via a control channel-CC 21-ATT 26 of NSW 22 ((2) of FIG. 6). CTL 41 lights the reception button lamp 43 of the reception console operation unit 55 via CBA 42-SDA 45, according to the call incoming lamp information, and also sounds a call incoming buzzer (not shown).

When the reception console manipulator depresses the reception button 44 of the operation unit 55, the button information is sent via SCA 46-CBA 42-CTL 41-ATT 26 to the switch main body (CC 21) ((3) of FIG. 6). A call incoming reply signal is returned from FPI 23 to FPT 3 ((4) of FIG. 6), and a call path (call channel) is formed between the subscriber and the reception console manipulator ((5) of FIG. 6), so that the call can proceed.

When the reception console manipulator depresses a disconnection button of the operation unit 55 at the end of the call, the button information is sent via SCA 46-CBA 42-CTL 41-ATT 26 to the switch main body ((3) of FIG. 6). The call disconnection signal is sent from FPI 23 to FPT 3 ((6) of FIG. 6), so that the emergency report line is restored.

Status information (call incoming, unused etc) of the emergency report line is sent from FPI 23 via the metallic information line 81 to the reception consoles $40_1$–$40_n$ so that all the reception consoles $40_1$–$40_n$ can monitor a status of the emergency report lines in realtime.

FIG. 7 shows an inter-console monitoring/interruption operation according to the related art. Inter-console monitoring enables monitoring the call contents of the reception console $40_1$ in which a 119 call is proceeding, from another reception console $40_n$. The monitored contents are used to back up the report reception console $40_1$ by, for example, originating a command to the related station. Inter-console interruption enables call interruption to the reception console $40_1$ in which a 119 call is proceeding, from another reception console $40_n$. A description will now be given of inter-console monitoring and call interruption performed by the reception console $40_n$ with respect to the reception console $40_1$ receiving a 119 call.

It is assumed that a call path is formed as described above between a subscriber and the reception console $40_1$, and a call is proceeding between the subscriber and the reception console manipulator ((1) of FIG. 7). When the manipulator of the reception console $40_n$ depresses an inter-console monitoring button 44 of the operation unit $55_n$, the button information is supplied to CTL $41_n$ via SCA $46_n$-CBA $42_n$. An inter-console monitoring activation SD point of IFC $50_n$ is turned ON under control of CTL $41_n$, and OTL $27_n$ is activated ((2) of FIG. 7). When the call origination is detected, OTL $27_n$ performs hot line connection using an extension (call connection not requiring a dial number) to OTL $27_1$ of the reception console $40_1$ ((3) of FIG. 7). A call path is formed between SPC $49_n$ of the reception console $40_n$ and SPC $49_1$ of the reception console $40_1$, so that the 119 call contents of the reception console $40_n$ can be monitored by the reception console $40_n$ ((4) of FIG. 7).

When the operation unit interruption button 44n of the reception console $40_n$ is depressed, the button information is supplied to CTL $41_n$ via SCA $46_n$-CBA $42_n$, and an interruption relay in SPC $49_n$ (not shown) is turned ON under the control of CTL $41_n$, so that the reception console $40_n$ can interrupt the 119 call in the reception console $40_1$ ((5) of FIG. 7). In this case, call interruption in SPC $49_1$ is performed by addition of the sound signal.

Restoration from inter-console monitoring/interruption is performed as follows. By depressing the disconnection button $44_n$ of the operation unit of the reception console $40_n$, the button information is supplied to CTL $41_n$ via SCA $46_n$-CBA $42_n$, and an inter-console monitoring activation SD point is turned OFF under the control of CTL $41_n$, so that the call path between the reception console $40_n$ and the reception console $40_1$ is terminated, thus restoring from inter-console monitoring/interruption connection.

FIG. 8 shows a station command operation.

A station command is given to an ambulance or a fire engine of a fire station according to the contents of the 119 call report. The command is issued when the reception console manipulator or operator has selected a target station. When a station button of the reception console operation unit $55_1$ is depressed, button information is sent to the switch main body (CC 21) via SCA $46_1$-CBA $42_1$-CTL $41_1$-ATT 26 ((1) of FIG. 8). CC 21 captures LDS 24 for a command recipient station ((2) of FIG. 8), and the command receiver apparatus 60 is activated by LDS 24. When LDS 24 detects a reply from the command receiver apparatus 60, a call path is formed to establish a connection SPA $47_1$-ATT 26-NSW 22-LDS 24, so that the command sound of the reception console manipulator is heard at the command receiver device 60 ((3) of FIG. 8). Plural stations may be simultaneously selected as destinations of the station command.

FIG. 9 illustrates a station command sequence of the emergency reporting system according to the related art. When the activation button of a station is depressed, $LDS_1$–$LDS_m$ corresponding to respective stations are captured successively by CC 21, so that the communication protocol of the command line described above with reference to FIG. 5 is executed between $LDS_1$–$LDS_m$ and the command receiver apparatuses $60_1$–$60_m$. Conventionally, a relatively long time was needed for capturing $LDS_1$–$LDS_m$ by NSW 22. When the sound amplifier of the command receiver apparatuses $60_1$–$60_m$ is activated, the command sound is delivered thereto all at once. After the command has been sent, disconnection of the station command is performed by depressing the disconnection button of the reception console operation unit 55

FIG. 10 shows a radio communication operation according to the related art. Radio communication provides backup for dispatched automobiles (fire engines, ambulances) after the station command has been originated. Call origination to a radio-equipped vehicle is performed such that a radio selection button of the reception console operation unit $55_1$ is depressed, so that the button information is supplied to CTL $41_1$ via SCA $46_1$-CBA $42_1$. A radio activation SD point of IFC 501 is turned ON and DMC 28 is activated under the control of CTL $41_1$ ((1) of FIG. 10). DMC 28 connects to RLT 25 by a hot line connection (FIGS. 24-2), so that a call path is formed to connect the reception console $40_1$-SPA $47_1$-SPC $49_1$-DMC 28-NSW 22-RLT 25 ((3) of FIG. 10). Radio communication occurring in this case with a vehicle is press talking because one frequency is used for two-way communication. When a press talk button of the reception console operation unit $55_1$ is depressed, the button information is supplied to CTL $41_1$ via SCA $46_1$-CBA $42_1$, a press SD point of IFC $50_1$ is turned ON under the control of CTL $41_1$, and the press information is transmitted to RFU 4.

A radio call incoming from a vehicle is recognized such that a call incoming signal from RFU 4 is displayed on each LSTDISP 51 of the reception consoles $40_1$–$40_n$ via RLT 25—the metallic information line 81 ((4) of FIG. 10), and radio call sound from the vehicle is delivered as-is to each MSP 52 of the reception consoles $40_1$–$40_n$ via RLT 25—the metallic sound line 82 ((5) of FIG. 10). A reply to this call incoming is performed by depressing the radio selection button so as to capture corresponding RLT 25, as described above with respect to a radio call origination operation.

FIGS. 11A and 11B illustrate system capacity of the emergency reporting system according to the related art.

FIG. 11A shows an implementation of a switch (equivalent to Fujitsu model E3160D) according to the related art. One rack includes a shelf of five steps, and each shelf may have 16 boards mounted thereon. The hatch-toned portion of FIG. 11A shows an arrangement of function units when a total of 14 reception consoles are mounted. CC, CPNW indicate function units in the control system, LT indicates a function unit in the interface system, and LT (console) indicates a function unit in the console interface system.

In the LT unit, NW00–NW03 indicate network numbers identifying switches, and HW00–HW31 are network highway numbers. A total of 32 channels (time slots) can be accommodated in one HW. According to the system of the related art, the 7-rack 4NW construction is needed when the 14 reception consoles are mounted, so that a total of 27 LT units are mounted.

FIG. 11B shows the number of MDF cables according to the related art. A compartment of FIG. 11B represents an MDF terminal board. Five MDF cables, each equivalent to 50-pin connector, can be accommodated in one terminal board. In the system according to the related art, MDF cables equivalent to a total of 750 50-pin connectors were needed.

As described above, call connection between apparatuses is effected by line switching via NSW 22 according to the related art, resulting in a relatively large system capacity. To be concrete, because inter-console monitoring/interruption is performed via NSW 22, SPC 49 which provides an interface between the reception console and NSW, IFC 50 for activation, OTL 27 for inter-console monitoring are necessary for each reception console. Because radio communication is performed via NSW 22, DMC 28 for radio connection that provides an interface between the reception console and NSW is necessary for each reception console.

Accordingly, the system capacity largely depends on the number of reception consoles. When the number of reception console increases, requests from customers for system size reduction cannot be met.

Because the number of connection packages increases with an increase of the number of reception consoles, the number of cables and MDF terminals also increase with that, thus causing a period of time required for the installation to be extended. To be concrete, display of line statuses including emergency, command, radio on the display of the reception console is effected by multiple connections to the line status display unit 51 of each reception console via the metallic information line 81 and MDF. Therefore, the number of cables and MDF terminals increases depending on the number of lines, and the number of reception consoles. Display of radio call incoming in the reception console, and delivery of the radio call sound are effected by multiple connection to each reception console (LDSISP 51, MSP 52) via the metallic information line 81, the metallic sound line 82 and MDF. Therefore, the number of cables and MDF terminals increases depending on the number of radio circuits, and the number of reception consoles.

Speedups of a station command operation, which is one of the major facilities provided by the emergency reporting system, is known as the most important task. According to the above system of the related art, connection to a station is effected by a call connection process of the switch main body, so that the connect time to a station largely depends on a call connection process time of the switch main body. In particular, when a command is to be originated to plural command receiver devices simultaneously, a relatively heavy load tends to be imposed on the switch main body (CC 21), causing the connect time of NSW 22 to increase significantly.

SUMMARY OF THE INVENTION

Accordingly, a general object of the present invention is to provide a data communication system in which the aforementioned problems are eliminated.

Another and more specific object of the present invention is to provide a communication system provided with a simple and flexible network construction in which high-speed data communication between terminals is easily performed.

The aforementioned objects can be achieved by the first invention which provides a data communication system comprising: a plurality of terminal apparatuses for periodically transmitting data, and for retrieving desired data accommodated in at least one time slot in received multiplex data; and a data storage and distribution apparatus for subjecting received data from said plurality of terminal apparatuses to time division multiplexing so as to produce time slots each corresponding to a respective one of said plurality of terminal apparatuses, reproducing resultant multiplex data, and distributing the multiplex data to said plurality of terminal apparatuses.

According to the second invention, the desired data may be one of sound data and information data.

A description will be given, with reference to FIG. 12B, of sound data flow according to a construction of the data communication system of the present invention.

As to terminal apparatuses #1–#n on both sides, apparatuses identified by the same numerals are identical to each other. FIG. 12B is intended to facilitate understanding of upstream sound data and downstream sound data.

Each of the terminal apparatuses #1–#n transmits respective sound data A-N periodically. The only requirement is that each of the sound data A-N is output at a predetermined period. It is not required that the sound data A-N produce successive phase shifts. After having subjected all received sound data A-N from terminal apparatuses to time division multiplexing to accommodate it in time slots allocated for respective terminals, a data storage and distribution device 30 reproduces the sound data and distributes the same between the terminal apparatuses #1–#n. Each of the terminal apparatuses #1–#n retrieves one or a plurality of time slots of sound data from multiplex data MV in the received frame addressed to itself, so that sound data is exchanged between terminal apparatuses #1–#n. To describe the operation more concretely, for example, terminal apparatus #2 retrieves sound data A of terminal apparatus #1, and terminal apparatus #1 retrieves sound data B of terminal apparatus #2, so that a call can proceed between terminal apparatus #1 and terminal apparatus #2. The other terminals operate similarly. Thus, practically, arbitrary n:n call path connection is possible.

Besides, such call path switching facilities can be realized by simple firmware control whereby each terminal changes the setting for retrieval of time slots. Call path switching can be flexibly operated using a simple network construction. Diverse types of calls can proceed at any time between terminal apparatuses without requiring the circuit switching facilities (NSW 22, CC 21) of the system of the related art. Thus, high-speed communication between terminals is made possible using a simplified system. According to the invention, a call path interface is provided so as to be common to all apparatuses, so that the capacity and cost of the communication system is reduced.

Needless to say, information data (instead of sound data) communication may also be performed according to a method of FIG. 12B.

The aforementioned objects can also be achieved by the construction of the third invention shown in FIG. 12A. The data communication system according to the third comprises: a plurality of terminal apparatuses for carrying information in at least one time slot of fixed-length transmission frame assigned to the terminal apparatus and periodically transmitting the transmission frame, and for retrieving desired data accommodated in at least one time slot in fixed-length received multiplex information data; and a data storage and distribution apparatus for subjecting reception frames received from said plurality of terminal apparatuses to a logical sum operation in such a manner as to maintain bit-to-bit correspondence, reproducing the sum, and distributing the sum to said plurality of terminal apparatuses.

A description will be given, with reference to FIG. 12C, of the flow of information data according to the third invention.

Each of the terminal apparatuses #1–#n carries information data in one or a plurality of time slots of fixed-length transmission frames allocated to itself, so as to transmit the information data periodically. A data storage and distribution apparatus obtains a logical sum of all received frame data from the terminal apparatuses, maintaining bit-to-bit correspondence, so as to reproduce and distribute the sum between the terminal apparatuses #1–#n described above. Each of the terminal apparatuses #1–#n retrieves information data in one or a plurality of time slots from the multiplex data RD of fixed-length reception frames allocated to itself. Thus, diverse information data exchange can proceed between terminal apparatuses.

To describe the operation concretely, diverse communication path connection methods are available.

For example, terminal apparatus #1 carries information data a' (0 for the other transmission slots) in the first transmission slot allocated to itself, and transmits the information data accordingly. Terminal apparatus #2 carries information data b' (0 for the other transmission slots) in the second transmission slot allocated to itself, and transmits the information data accordingly. Each transmission frame is subject to logical sum by the data storage and distribution apparatus, maintaining bit-to-bit correspondence. The data storage and distribution apparatus also reproduces the sum. In this example, the downstream frame is such that the first slot data a=a', and the second slot data b=b'. Accordingly, on the downstream side, terminal apparatus #1 retrieves information data b from the second reception slot, and terminal apparatus #2 retrieves information data a from the first reception slot so that information data communication between the terminal apparatuses #1 and #2 is made possible. This means that information data exchange described with reference to FIG. 12B is possible according to the third invention. Thus, information data originated in a given terminal apparatus (status data, notification data) can be referred to by any other terminal apparatus.

Alternatively, for example, terminal apparatus #1 carries information data b' (0 for the other transmission slots) addressed to terminal apparatus #2 in the second transmission slot and transmits the information data accordingly. Terminal apparatus #2 carries information data a' (0 for the other transmission slots) addressed to terminal apparatus #1 in the first transmission slot and transmits the information data accordingly. The first slot data of the downstream frame a=a', and the second slot data b=b'. Accordingly, on the downstream side, terminal apparatus #1 retrieves information data a addressed to itself from the first reception slot for itself, and terminal apparatus #2 retrieves information data b addressed to itself from the second reception slot for itself so that information data communication between terminal apparatuses #1 and #2 is made possible. Thus, information data (command data, response data, notification data) can be directly written in the time slot for the destination terminal apparatus according to the construction of the third invention.

In actual use, diverse data communication is possible by using one of the above-described two information transfer methods. In this case, when specified bits of each upstream frame is set to 1 and 0, respectively, a corresponding bit of a downstream frame is set to 1 (logical OR output). The details of the communication method will become clearer by the description of the embodiments that follows.

According to the fourth invention, each of said plurality of terminal apparatuses may periodically transmit sound data and retrieves desired sound data accommodated in at least one time slot in received multiplex sound data, and said data storage and distribution apparatus may subject sound data received from said plurality of terminal apparatuses to time division multiplexing so as to produce time slots each corresponding to a respective one of said plurality of terminal apparatuses, and reproduce resultant multiplex data so as to distribute the same to said plurality of terminal apparatuses.

According to the data communication system of the fourth invention, information data communication facilities according to the system of FIG. 12C and sound data communication facilities according to the system of FIG. 12B are combined. Thus, as shown in FIG. 12A, sound and information data communication can be efficiently performed by a simple network construction and firmware control.

The aforementioned objects can also be achieved by the fifth invention which provides a data storage and distribution apparatus for use in a data communication system in which a plurality of terminal apparatuses perform data communication with each other via said data storage and distribution apparatus, wherein said data storage and distribution apparatus subjects data periodically received from said plurality of terminal apparatuses to time division multiplexing so as to produce time slots each corresponding to a respective one of said plurality of terminal apparatuses, reproduces resultant multiplex data, and distributes the multiplex data to said plurality of terminal apparatuses.

The aforementioned objects can also be achieved by the sixth invention which provides a data storage and distribution apparatus for use in a data communication system in which a plurality of terminal apparatuses perform data communication with each other via said data storage and distribution apparatus, using transmission frames of a common format, wherein said data storage and distribution apparatus subjects frame data received from said plurality of terminal apparatuses to time division multiplexing, reproduces resultant multiplex data, and distributes the multiplex data to said plurality of terminal apparatuses.

The aforementioned objects can also be achieved by the seventh invention which provides a terminal apparatus for use in a data communication system in which a plurality of said terminal apparatuses perform data communication with each other via a data storage and distribution apparatus accommodating said plurality of said terminal apparatuses, wherein said terminal apparatus periodically transmits data and retrieves desired data accommodated in at least one time slot of multiplex received data.

According to the eighth invention, each of said terminal apparatuses may comprise: an emergency report trunk apparatus for connecting to an emergency report line of a public network; a reception console apparatus for receiving an emergency report of a subscriber; a command line interface connected to a command receiver apparatus provided at locations including a fire station and a police station; and a radio circuit interface for connecting to a remote radio base station apparatus.

Objectives such as reduction of station command time, reduction of system capacity, reduction of volume of MDF and connection cables, reduction of a time required for delivery, and reduction of cost are achieved at one sweep by applying the data communication system according to the eighth invention to an emergency report system. The details will become clearer by the description of the embodiments to follow.

The data communication system may further comprise a plurality of reception console apparatuses, wherein a first reception console of said plurality of reception consoles retrieves sound data exchanged between said emergency report reception trunk apparatus and a second reception console of said plurality of reception consoles.

Accordingly, inter-console monitoring facilities in an emergency report system are realized by a simple construction and firmware control.

According to the tenth invention, sound data from said first reception console may be retrieved by at least one of said emergency report reception trunk apparatus and said second reception console.

Accordingly, inter-console monitoring/interruption facilities in an emergency report system are realized by a simple construction and firmware control.

According to the eleventh invention, the data communication system may further comprise a plurality of reception consoles, wherein each of said plurality of reception consoles displays on a display unit information relating to an operating condition of at least one reception console apparatus, said information being included in multiplex received information data.

Therefore, according to the eleventh invention, the line status information, which is distributed by the metallic information line 81 between the reception console display units according to the related art, is put together in the form of multiplex information data RD. The multiplex information data RD is distributed efficiently between the reception console apparatuses in real time and displayed at each reception console display unit.

The aforementioned objects can also be achieved by the twelfth invention which provides a data switching apparatus comprising: an emergency report reception trunk apparatus for connecting to an emergency report line of a public network; a reception console interface for connecting to a reception console for receiving an emergency report from a subscriber; a radio circuit interface apparatus for connecting to a remote radio base station apparatus; a sound data storage and distribution apparatus for subjecting sound data periodically received from a plurality of peripheral apparatuses to time division multiplexing so as to produce time slots each corresponding to a respective one of said plurality of peripheral apparatuses, reproduces resultant multiplex data, and distributes the multiplex data to said plurality of peripheral apparatuses.

Accordingly, the data exchange apparatus according to the twelfth invention is reduced in size and can be installed at a reduced cost and in a reduced period of time. Moreover, the installed apparatus operates so as to provide high performance and high reliability.

According to the thirteenth invention, each of said plurality of peripheral apparatuses may periodically output externally input sound data to said sound data storage and distribution apparatus, retrieve sound data accommodated in at least one time slot in multiplex sound data from said sound data storage and distribution apparatus so as to synthesize the sound data, and output resultant synthesized sound data to one of a connection line and the reception console.

Accordingly, a common sound connection interface of a simple construction can accommodate various peripheral apparatuses (an emergency report reception trunk, a reception console connection package and the like) connected to the sound data storage and distribution apparatus. Each peripheral apparatus can exchange a desired sound signal (sound data) with an external apparatus. Synthesis of sound data is easily implemented by addition of the sound data.

According to the fourteenth invention, the data switching apparatus may further comprise a line switching unit including a call controller and a call path switch provided between an emergency report reception trunk and a reception console interface apparatus, said line switching unit notifying the reception console interface apparatus of call incoming of an emergency call arriving via the emergency report reception trunk apparatus, and capturing an unused line in accordance with a call transfer request from the reception console interface apparatus so as to transfer the emergency call to a call transfer destination.

In actual operation of the emergency report system, an incoming call occurring on an emergency report line may be transferred to a related third party (for example, to utilities). The emergency report line operated such as that may continue to be accommodated in the line switching facilities according to the related art.

BRIEF DESCRIPTION OF THE DRAWINGS

Other objects and further features of the present invention will be apparent from the following detailed description and the drawings, in which:

FIG. 2 shows a signaling system of an emergency report line according to the related art;

FIG. 11A shows an implementation of a switch according to the related art;

FIG. 11B shows the number of MDF cables according to the related art;

FIG. 15 shows a format of an information area assigned to FPI;

FIG. 16 shows a frame format of an information area allocated to the reception console;

FIG. 18 shows a frame format of an information area assigned to RLT;

FIG. 19 shows a 119 call reception operation according to the invention;

FIG. 25A shows how a switch is implemented according to the invention; and

FIG. 25B shows the number of MDF cables according to the invention.

DETAILED DESCRIPTION OF THE PREFERRED EMBODIMENTS

Figure 1A:
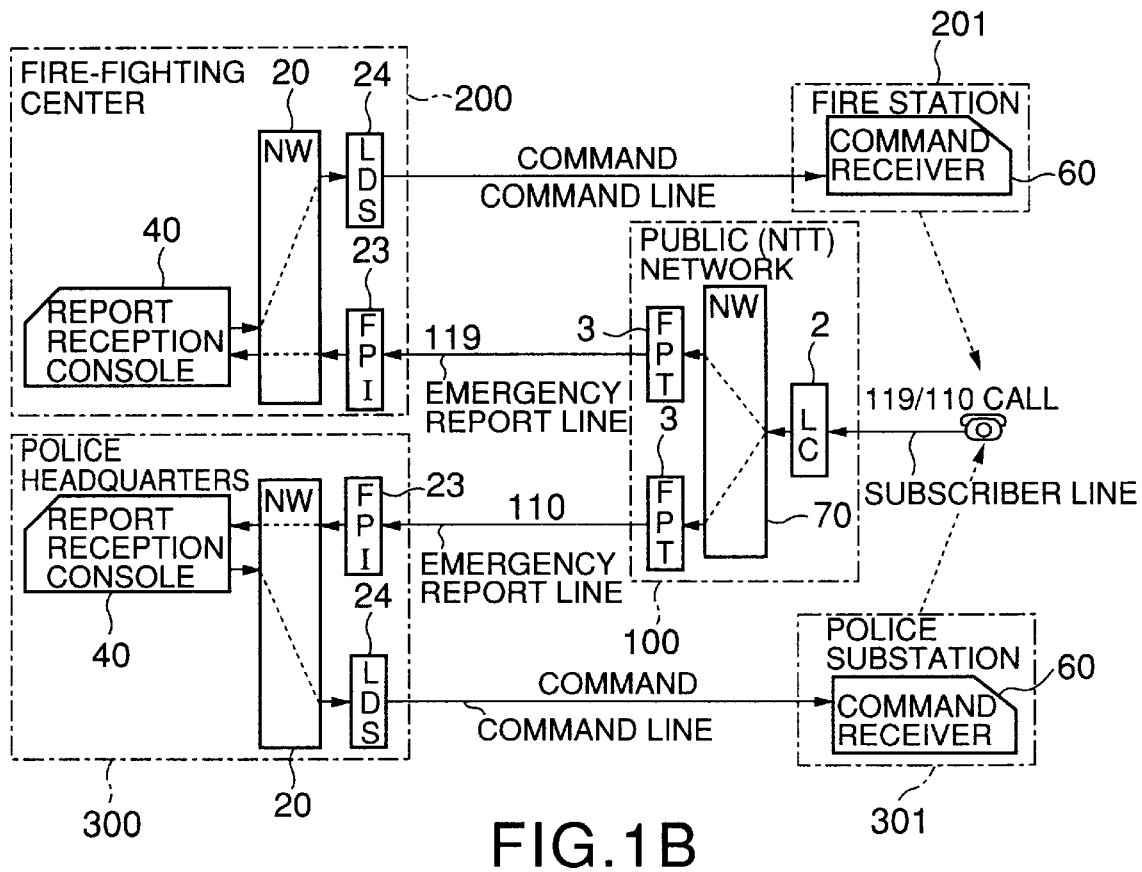
FIG. 1A is a schematic diagram showing a construction of an emergency report system according to the related art.
Figure 1B:
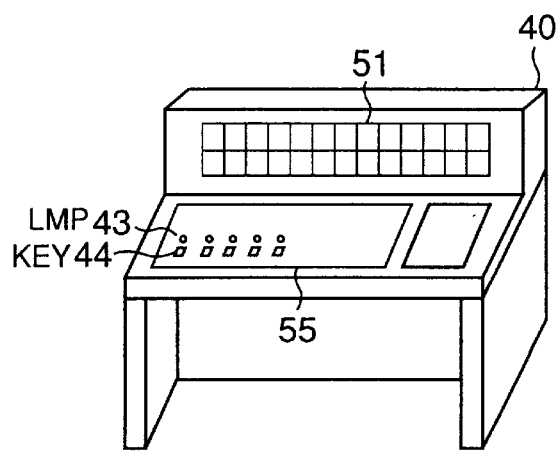
FIG. 1B is a perspective view showing a report reception console according to the related art.

In the drawings, parts that are identical to each other are designated by the same reference numerals.

When the term "apparatus" is used in the following description, it is meant to include FPI 23, the reception console 40, LDS 24, and RLT 25. The term "sound data" indicates sampled data derived the sound, and the term "information data" refers to data other sound data (for example, lamp information, status information, button information, response information, and the like).

Figure 3:
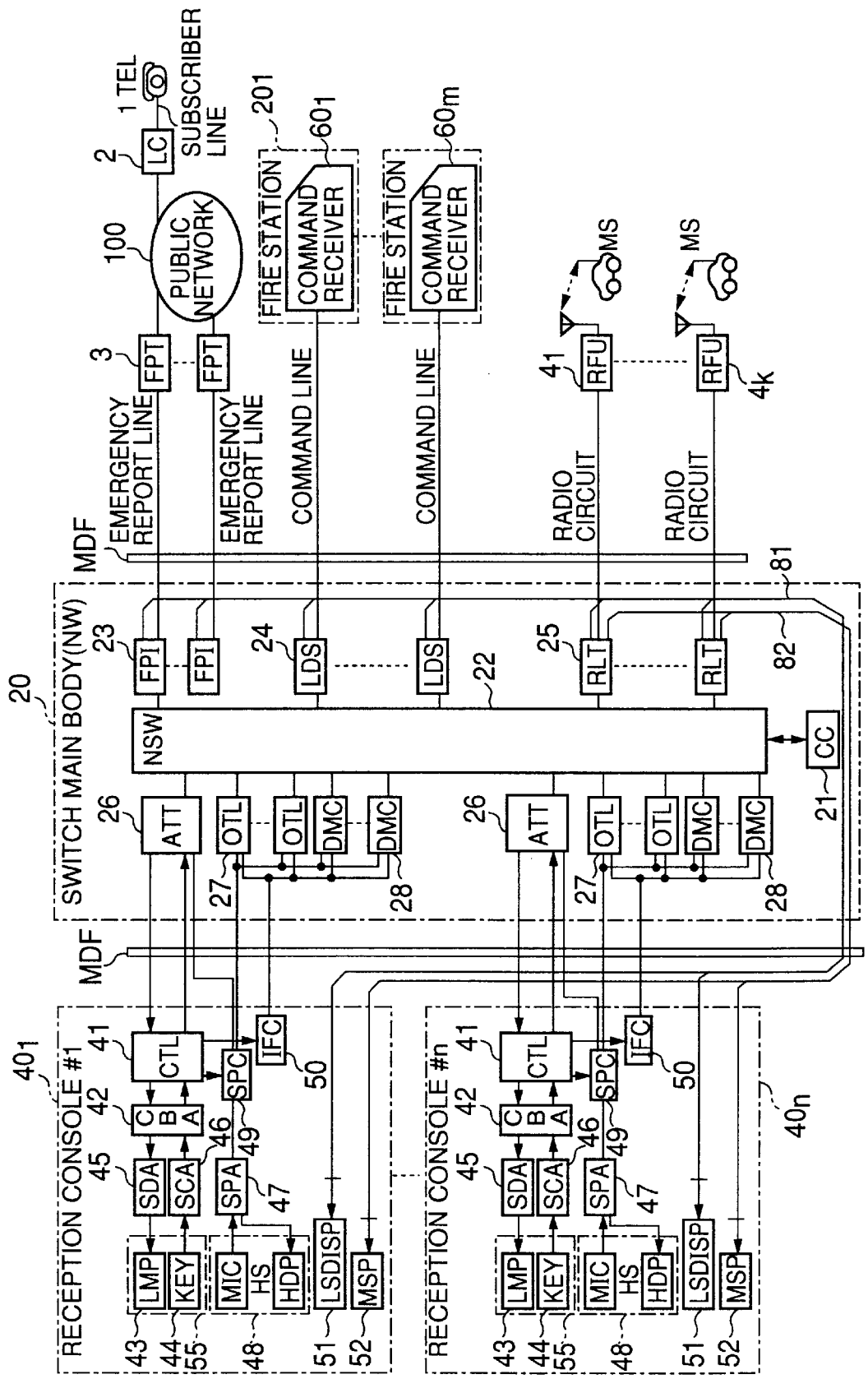
FIG. 3 shows a construction of the emergency report system according to the related art.
Figure 13:
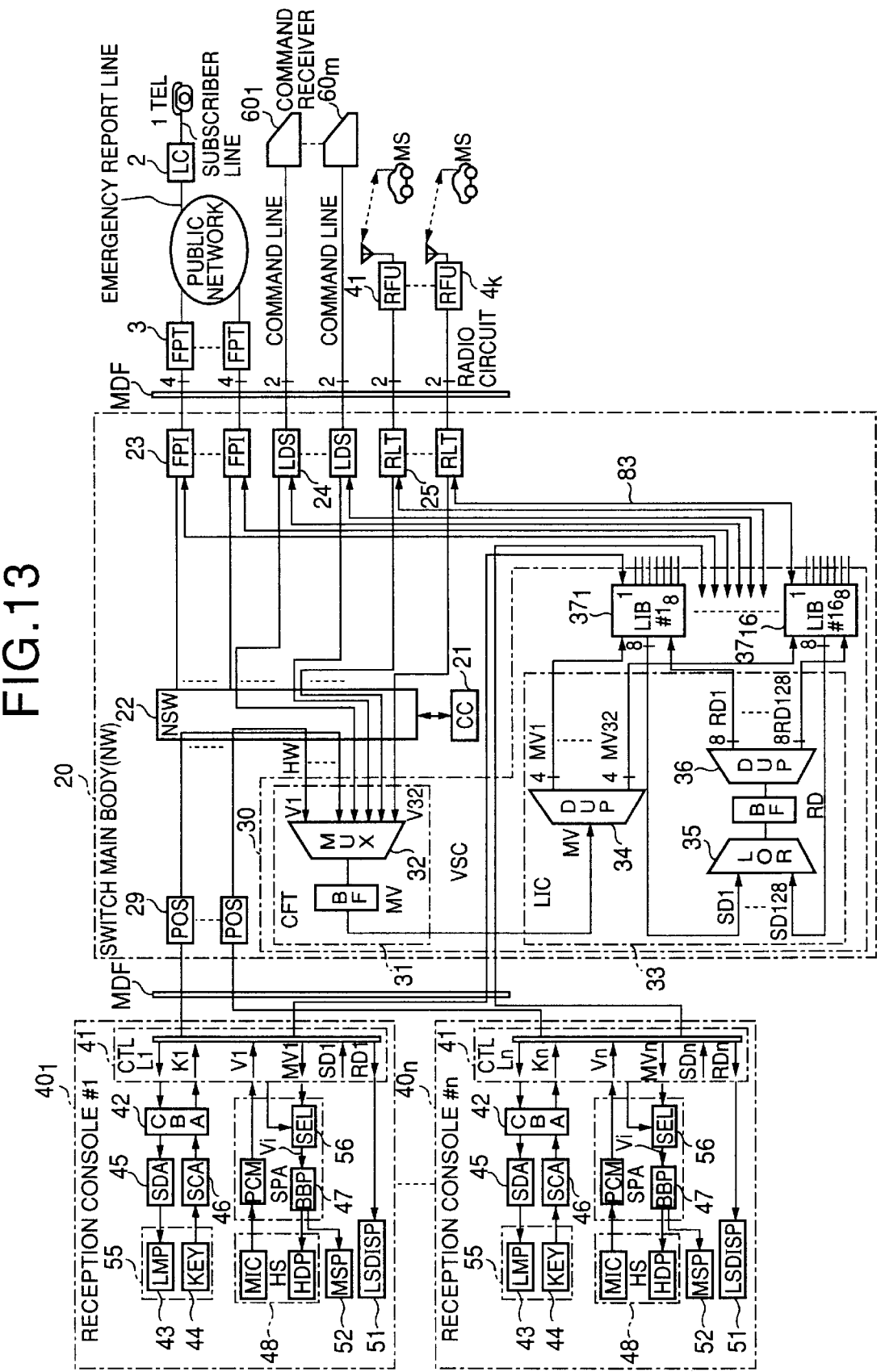
FIG. 13 shows a construction of an emergency report system according to the present invention.

FIG. 13 shows a construction of an emergency report system according to the present invention. The same facilities as implemented by the construction of FIG. 3 are implemented by the construction of FIG. 13. However, a different technical idea is applied to the construction of FIG. 13.

Referring to FIG. 13, the emergency report system comprises the switch main body (NW) 20, the reception consoles $40_1$–$40_n$ (#1–#n), the command receiver apparatuses $60_1$–$60_n$, and radio apparatuses (RFU) $41_1$–$4_n$.

NW 20 includes the call controller (CC) 21, the call channel switch (NSW) 22, a network highway HW, the emergency report reception trunk (FPI) 23, the command line trunk (LDS) 24, the radio circuit trunk (RLT) 25, a reception console connection package (POS) 29 connected to the reception console 40, a data storage and distribution unit (VSC) 30 for multiplexing and distributing sound data and information data, a sound multiplexing unit (CFT) 31 for multiplexing sound data V, a sound multiplexer unit (MUX) 32, a buffer memory BF, a multiplexing unit (LIC) for distributing sound multiplex sound data MV, for producing a logical sum of the data, and for distributing the logical sum, a sound data distribution unit (DUP) for distributing the multiplex sound data MV, a multiplex information data logical sum unit (LOR) 35 for producing a logical sum of the multiplex information data SD, a data distributing unit (DUP) 36 for distributing the multiplex information data RD produced as a result of the logical sum, a line interface (LIB) 37 for connecting VSC 30 to the multiplex sound data MV and the multiplex information data SD, RD occurring in the apparatuses, and a LIB cable 83 for connecting LIB 37 to the apparatuses.

The reception console 40 comprises the reception console control package (CTL) 41, the lamp/button information processing unit (CBA) 42, the reception console operation unit 55, the lamp information display unit (LMP) 43, the button operation unit (KEY) 44, the lamp driver (SDA) 45, the button operation discrimination unit (SCA) 46, the sound processing unit (SPA) 47, a PCM encoder PCM, a base band processing unit BBP, a sound data selector (SEL) 56, a head set or a hand set (HS) 48, a microphone MIC, a headphone HDP, a line status display unit (LSDISP) 51, and a monitor speaker (MSP) 52.

A description will now be given of the function of each component.

VSC 30 replaces line switching facilities implemented by NSW 22, CC 21 in the system according to the related art. VSC 30 is provided with facilities for multiplexing sound and information data from all apparatuses and for distributing the multiplex output between all apparatuses.

To be concrete, sound data V1–V31 from the apparatuses is input to CFT 31 via NSW 22. The call paths of NSW 22 for the sound data V1–V31 are always maintained. MUX 32 subjects the sound data V1–V31 to time division multiplexing and sends output multiplex sound data MV to LIC 33. DUP 34 of LIC 33 reproduces the multiplex sound data MV, and distributes the same between LIBs $37_1$–$37_{16}$. Since a base of each LIB 37 is provided with a circuit 8 interfaces and an LIB connector, and since VSC 30 can have a maximum of 16 LIBs 37 mounted thereon, interfaces for a maximum of 128 apparatuses can be implemented by VSC 30.

Like the system of the related art, the system of the invention also processes a 119 call capability via FPI 23-NSW 22-POS 29-CTL 41 because, in practical operations, the reception console 40 that has accepted a 119 call may transmit the call to another fire station or to a related organization (the police, an electric power company, a gas company). Such transfer is most effectively performed by capturing an unused line of NSW 22.

When such call transmission need not be considered, line switching facilities implemented by NSW 22, CC 21 can be omitted, and VSC 30 can directly accommodate the emergency report line (i.e. FPI 23). An operation in this case will be described later with reference to FIG. 20.

Multiplex information data SD1–SD128 from the apparatuses is directly input to LOR 35 of LIC 33 via the LIB cable 83 without being mediated by NSW 22. LOR 35 produces a logical sum of the input multiplex information data SD1–SD128, and output the resultant multiplex information data RD to DUP 36. DUP 36 reproduces the multiplex information data RD and distributes the same to LIBs $37_1$–$37_{16}$. The LIB cable 83 could be a common telephone wire cable of 5 cores, for example.

The other components of the system are similar to the corresponding components of the related art.

FPI 23 of NSW 20 is provided with facilities for detecting 119 call incoming and notifying the reception console 40 accordingly via NSW 22, facilities for sending a re-ring call/disconnection signal to the emergency report line in response to a re-ring call operation/restoration operation by the reception console 40, facilities for displaying the status of the emergency report line on LSDISP 51 of the reception console 40 via VSC 30. Display of the status of the emergency report line is performed similarly to the related art.

LDS 24 is provided with facilities whereby it is captured via VSC 30 in response to an operation in the reception console, so as to send an activation signal (a ringing tone) to the command receiver apparatus 60, facilities for detecting a reply (a loop) from the command receiver apparatus 60, and sending reply information to the reception console 40 via VSC 30, facilities for sending command sound from the reception console 40 to the command receiver apparatus 60 via VSC 30, and facilities for displaying a status of the command line on the LSDISP 51 of the reception console 40 via VSC 30. Display of the status of the command line is performed similarly to the related art.

RLT 25 is provided with facilities whereby it is captured via VSC 30 in response to an operation in the reception console, so as to call a radio-equipped vehicle, facilities for providing the reception console 40 with a call incoming signal from RFU 4 and radio call sound from the automobile, and facilities for displaying a status of the radio circuit on LSDISP 51 of the reception console 40 via VSC 30. Display of the status of the radio circuit is performed similarly to the related art.

POS 29 corresponds to ATT 26 of the related art. POS 29 is provided with facilities for sending 119 call incoming information from NW 20 to the reception console 40, facilities for sending call origination information from the reception console 40 to NW 20, facilities for relaying a call between the reception console 40 and the subscriber.

CTL 41 of the reception console 40 is provided with facilities for performing main control of the reception console 40, facilities for exchanging lamp information L and button information K with POS 29.

PCM of SPA 47 samples the input sound signal of the microphone 48 at 8 KHz (at 125 $\mu$S period) and converts it into 8-bit sound data (PCM codes). SEL 56 retrieves desired one or a plurality of time slots (call channel) of sound data from the input multiplex data MV under the control of CTL 41. BBP converts the retrieved sound data into a sound signal, and outputs the same to HDP.

Figure 14A:
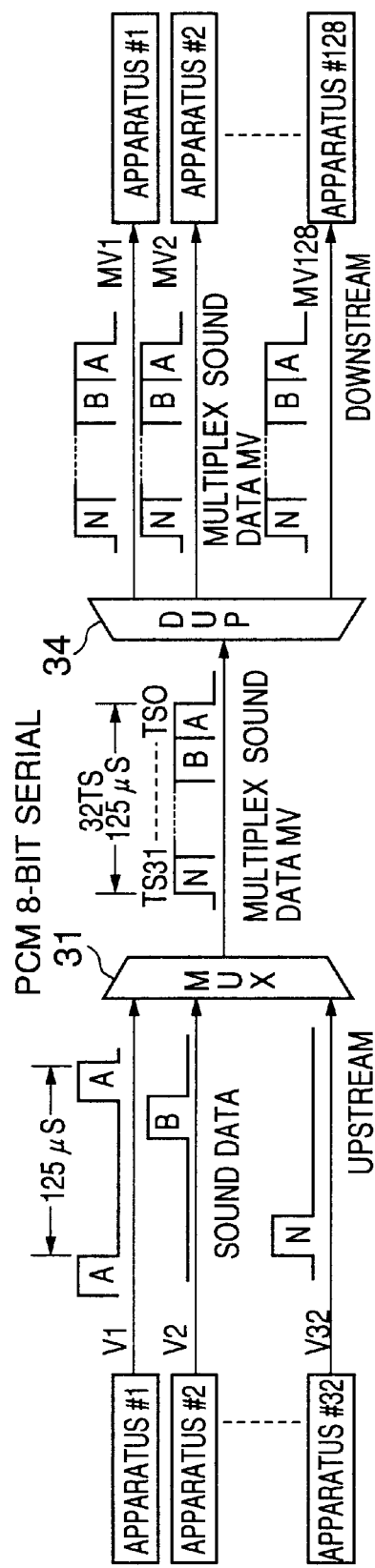
FIG. 14A shows a flow of sound data according to the invention.
Figure 14B:
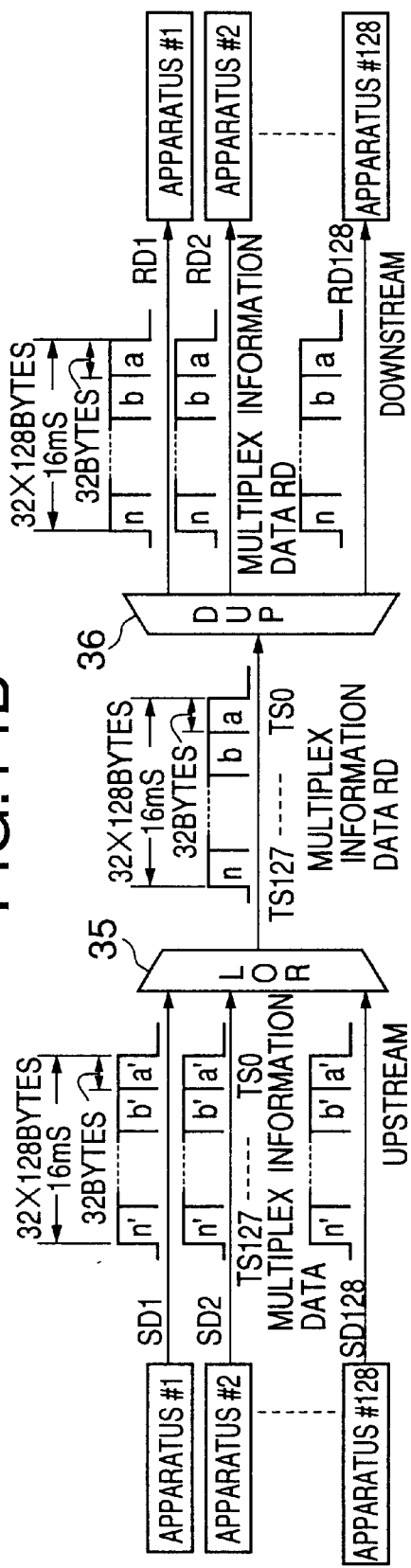
FIG. 14B shows a flow of information data according to the invention.

FIG. 14A shows a flow of sound data according to the invention, and FIG. 14B shows a flow of information data according to the invention.

Circuit switching facilities provided by NSW22, CC21 are not considered here. Instead, data flow in a generalized network construction implemented by VSC30 will be described.

Each of the apparatuses #1–#n correspond to FPI 23, the reception console 40, LDS 24 or RLT 25. Interface between VSC30 and FPI 23, LDS 24, RLT 25 is the same as the interface facilities (CTL41, SEL56) provided with respect to the reception console 40.

According to this system, sound and data switching facilities are realized by VSC30 having a simple function of multiplexing and distributing data for each apparatus and by information selection facilities (firmware control) common to the apparatuses. Thus, versatility and flexibility are provided.

FIG. 14A shows sound data flow.

Apparatuses #1–#32 on the left side of FIG. 14A are identified as sound output apparatuses which can output original sound data V1–V32, respectively. For example, apparatus #1 (FPI 23) outputs sound data V1 of a subscriber (=A), and apparatus #2 (reception console 40) outputs sound data V2 of a manipulator or operator (=B). A similar description applies to the other apparatuses as well.

It is not necessary to limit the number of sound output apparatuses to a maximum of 32. The maximum of 32 sound output apparatuses is specified because there 32 time slots (the time slot of one HW) in the switch. If a unique frame construction can be provided by VSC 30, as many as 128 sound output apparatuses may be served.

Apparatuses #1–#128 on the right side of FIG. 14A are identified as sound input apparatuses to which multiplex sound data MV is input, and which retrieve one or a plurality of sets of desired sound data. For example, apparatus #1 (FPI 23) retrieves sound data B of a manipulator of apparatus #2 (reception console 40) from the multiplex sound data MV, and apparatus #2 (reception console 40) retrieves sound data A of a subscriber of apparatus #1 (FPI 23) from the multiplex sound data MV. A call proceeds in this way between a subscriber and a reception console manipulator.

The multiplex data MV can be retrieved by all apparatuses, so that there is a maximum of 128 sound input apparatuses.

With this construction, each of the apparatuses #1–#32 outputs 8-bit serial sound data V1–V32 at a 125 $\mu$s period. The requirement is that the sound data V1–V32 is output at an interval of 125 $\mu$s, there being no need for output phase shifts as illustrated. For example, MUX 31 multiplexes the sound data V1–V32 in the order of the identification numbers assigned to the apparatuses, for example. Sound data A of apparatus #1 is inserted in TS0, and sound data B of apparatus #2 is inserted in TS1, and so on until sound data N of apparatus #32 is inserted in TS32. One frame of the resultant multiplex sound data MV has a period of 125 $\mu$s and contains 3 TSs. DUP 34 reproduces the multiplex sound data MV and distributes the same between apparatuses #1–#128 via LIB 37. Each of the apparatuses #1–#128 activates SEL 56 under the firmware control equivalent to CTL 41 and retrieves one or a plurality of sets of desired sound data V from the multiplex sound data MV, so as to output the same to HDP or the connection line. When a plurality of sets of sound data V are retrieved, they are added together before the output.

FIG. 14B indicates a flow of information data according to the invention.

Since exchange of information data is performed via VSC 30, all apparatuses #1–#128 are provided with information data transmission and reception facilities. One frame of information data in the upstream line contains 128 TSs, each TS containing 32-byte bit serial data. Each of the apparatuses #1–#128 generates bit serial data of 4096 bytes (128 TS×32 bytes=4096 bytes) and sends the same to VSC30 as one frame having a 16 ms period.

Transmission slots TS0–TS127 are allocated to the apparatuses #1–#128, respectively. For example, TS0 is allocated to apparatus #1. Data a' which apparatus #1 wrote to the transmission slot TS0 allocated to itself can be referred to as information data from apparatus #1 by the other apparatuses #2–#128. Apparatus #1 can write information data b'–n' in the transmission slots TS1–TS127. In this way, apparatus #1 can transfer information data to any of the desired apparatuses #2–#128 by using the two methods described above. A similar description applies to apparatuses #2–#128.

Since information data in an upstream line is multiplexed data containing 128 TSs, the information data is referred to as multiplex information data SD, SD indicating transmitted data.

LOR 35 produces a logical sum of all multiplex information data SD1–SD128, maintaining bit-to-bit correspondence so as to produce the multiplex information data RD. One frame of the multiplex information data RD contains 128 TSs, each TS containing 32-byte bit serial data. The first bit of the head data a at the head of the multiplex information data RD corresponds to a logical sum output of the first bits of the head data a' of all the multiplex information data SD1–SD128. DUP36 reproduces the input multiplex information data RD and distributes the same between all apparatuses #1–#128 via the downstream line.

In this case, apparatus #1 can read information data a written by the apparatuses #2–#128 and addressed to itself, by referring to a received slot TS0 destined to itself. Apparatus #1 can read information data b–n that the other apparatuses #2–#128 generated, by referring to the other received slots TS1–TS127. In this way, apparatus #1 can receive information data sent from desired ones of the apparatuses #2–#128 according these two methods. A similar description also applies to the other apparatuses #2–#128.

Thus, a flexible, diverse network connection can be constructed under simple firmware control for selecting transmitted and received time slots TS. In further accordance with the system of the invention, realtime N:N connection between arbitrary apparatuses is possible and the purpose of hardware sharing and reduction is better served than the related art.

FIGS. 15–18 show formats of a frame of information data according to the invention.

FIG. 15 shows a format of an information area assigned to FPI 23. Since one FPI 23 accommodates four emergency report lines, the information area of 32 bytes is divided into 4.

In line 0, SD means information (write) data sent from FPI23 to the reception console 40. This information data may be referred to by another apparatus. (1) represents an emergency report line state notification (that is, a bit for notifying the reception console 40 of the status) containing 5 bits. 5 bits indicate "unused", "call incoming", "holdback" "re-ring" and "disconnection by reporter" statuses of the emergency report line, respectively. (2) represents a normality verification bit (1 bit). For example, bit (2) is alternately set to 1 (ON) and 0 (OFF) at an interval of one second when FPI 23 operates normally. The reception console 40 recognizes that FPI 23 is operating normally and LIB cable 83 is not disconnected by acknowledging that the normality verification bit (2) in the FPI information area of the multiplex information data RD is alternately turned ON and OFF. "Unused" represents an unused bit. For example, 0 is written in that bit. (3) represents a checksum area (8 bits) in which parity check information for all information ROW00–ROW07 of the FPI information area, for example, is written.

FIG. 16 shows a frame format of an information area allocated to the reception console 40. SD basically means information data sent to another reception console, and SCAN means information data sent from another reception console. SD/SCAN means that each information bit of this information area is read/write enabled. That is, the information bit written by the reception console $40_1$ in a frame allocated itself is read by another reception console $40_2$. The information bit written by the other reception console $40_2$ in a frame allocated to itself is read by the reception console $40_1$.

(1) represents a reception console state notification (7 bits), wherein each bit corresponds a respective one of different statuses of the reception console, including "unattended", "unused", "call proceeding", "command proceeding", "radio communication proceeding", "call incoming" and "holdback" statuses of the reception console. (2) represents a normality verification bit (1 bit). (3) represents tripartite/manipulator bits (2 bits), a "tripartite" state being a state wherein a manipulator of another reception console interrupts a call between a subscriber and a reception console manipulator so as to make a tripartite call, and a "manipulator" state being a state where a call proceeds between reception console manipulators excluding a subscriber. (4) represents interruption request pattern bits (16 bits), wherein each bit corresponds to a destination reception console of an inter-console interruption request. (5) represents a checksum area (8 bits) in which parity check information for all information ROW00–ROW04 of the reception console information area, for example, is written.

Figure 17:
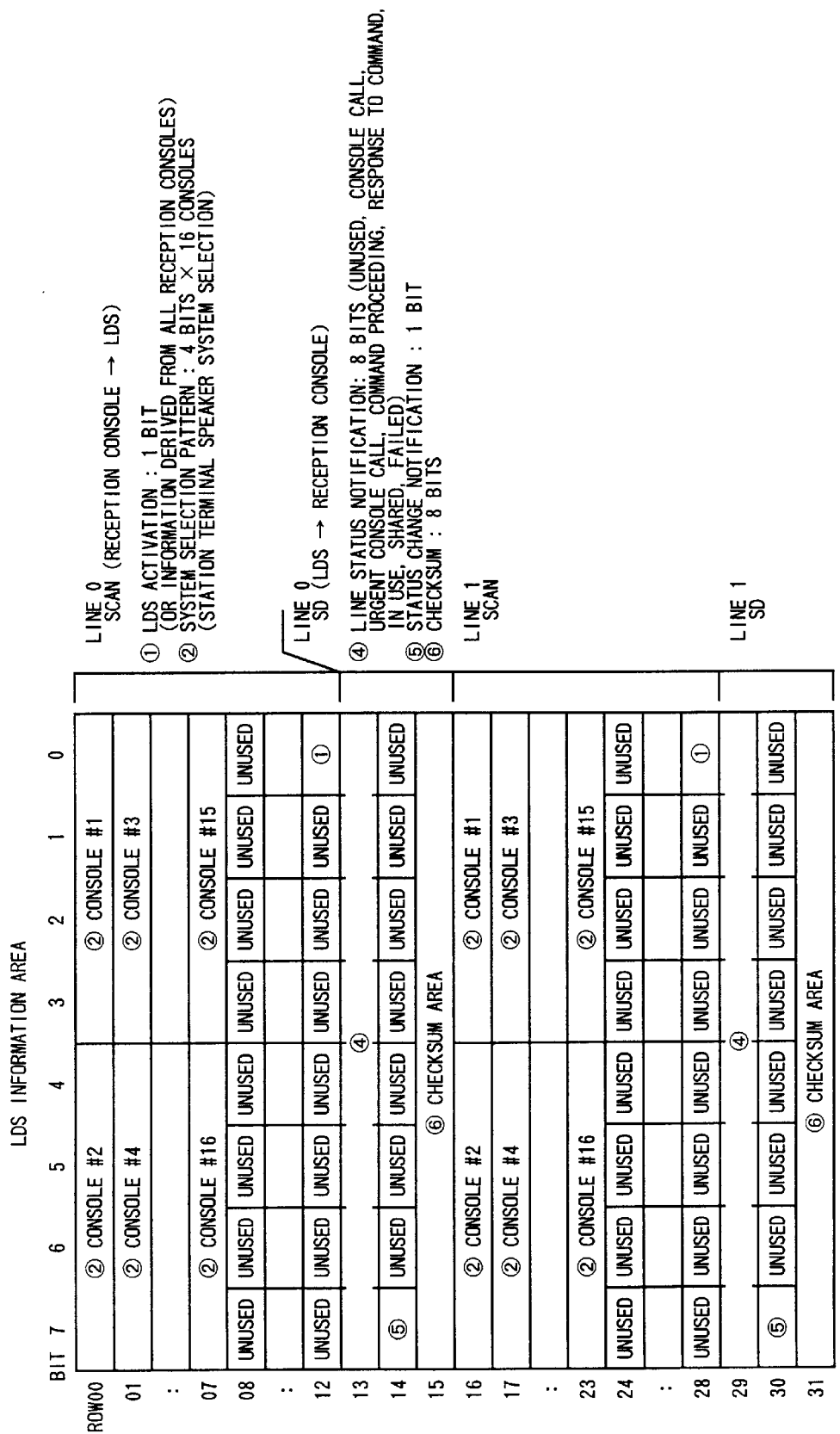
FIG. 17 shows a frame format of an information area assigned to LDS.

FIG. 17 shows a frame format of an information area assigned to LDS 24. Since one LDS 24 accommodates two command lines, the information area of 32 bytes is divided into 2.

In line 0, SCAN basically means information data sent from the reception console 40 to LDS 24. (1) represents an LDS activation bit (1 bit) which carries logic OR information of the activation bits from all reception consoles. When this bit (1) is set to 1 by any one of the reception consoles $40_1/40_2$ for the same LDS 24, the logical sum produced by LOR 35 is read by the associated LDS 24. (2) represents a system selection pattern (each containing 4 bits). An area corresponding to 16 reception consoles are provided. With this, a selection can be made for connecting sound data from a selected one of the reception consoles to the command receiver apparatus 60 (terminal loud speaker) connected to line 0.

SD basically means information data sent from LDS 24 to the reception console 40. (4) represents a command line state notification (8 bits), wherein each bit corresponds to a respective one of different statuses including "unused", "console call", "urgent console call", "command proceeding", "response to command", "in use", "shared" and "failed" statuses of the command line. (5) represents a state change notification (1 bit). Bit 1 is sent when the status of the command line is changed. (6) indicates a checksum area (8 bits) of LDS information area ROW00–ROW15.

FIG. 18 shows a frame format of an information area assigned to RLT 25. Since one RLT 25 accommodates two radio circuits, a 32-byte information area is divided into two.

In line 0, SD basically means information data sent from RLT 25 to the reception console 40. (1) indicates an area for 1 bit, supplied from the radio circuit, indicating that a press talk button is pressed. (2) indicates squelch OFF (1 bit) which means that an extremely low power radio wave cutting button is pressed. (3) indicates call incoming (1 bit) indicating detection of call incoming from the radio circuit. (4) indicates command proceeding (1 bit) indicating that a command is being carried by the radio circuit. (5) indicates "in use" (that is, the radio circuit is being used) indicated by 1 bit. (6) indicates an area for 3 bits indicating that the base station received the closest radio-equipped vehicle with a maximum reception level. (7) indicates reception console display (5 bits). (8) indicates status change notification (1 bit). (9) indicates a checksum area (8 bits) for the bits.

SCAN basically means information data sent from the reception console 40 to RLT 25. (1) indicates an area for 1 bit carrying an OR of the "pressed" (meaning that the press talk button is pressed) bits from all reception consoles. (2) indicates an area for 1 bit carrying an OR of the squelch bits from all reception consoles. (3) indicates an area for 1 bit carrying an OR of the fire station CH activation bits from all reception consoles. (4) indicates an area for 1 bit carrying an OR of "unused" (meaning that the reception console is unused) bits from all reception consoles. (5) indicates an area for 16 bits each carrying the "pressed" bit of the respective reception console. (6) indicates an area for 48 bits (3 bits×16 consoles) carrying designation of the base station by each reception console.

Display of call incoming from the radio circuit on LSDISP 51 of the reception console 40 is performed such that, as in the case of 119 call incoming, RLT 25 detects call incoming from the radio circuit so as to turn ON the call incoming bit (3) (ROW0-BIT2) in the RLT information area. In radio communication that occurs after a reply is made to the call incoming, various signals for controlling sound and (press signal, squelch signal, radio activation signal) are exchanged via VSC 30.

119 call reception, inter-console monitoring/interruption, station command, radio communication operation, which are major facilities of this system, will now be explained.

In the description that follows, it is assumed that FPI 23 is allocated to TS00 of the multiplex frame, the reception console #1 is allocated to TS01, the reception console #2 is allocated to TS02, LDS 24 is allocated to TS03, RLT 25 is allocated to TS04.

FIG. 19 shows a 119 call reception operation according to the invention, wherein call connection between FPI 23 and the reception console 40 is performed by the line switching facilities of NSW 22, CC21.

Figures 4A, 4B:
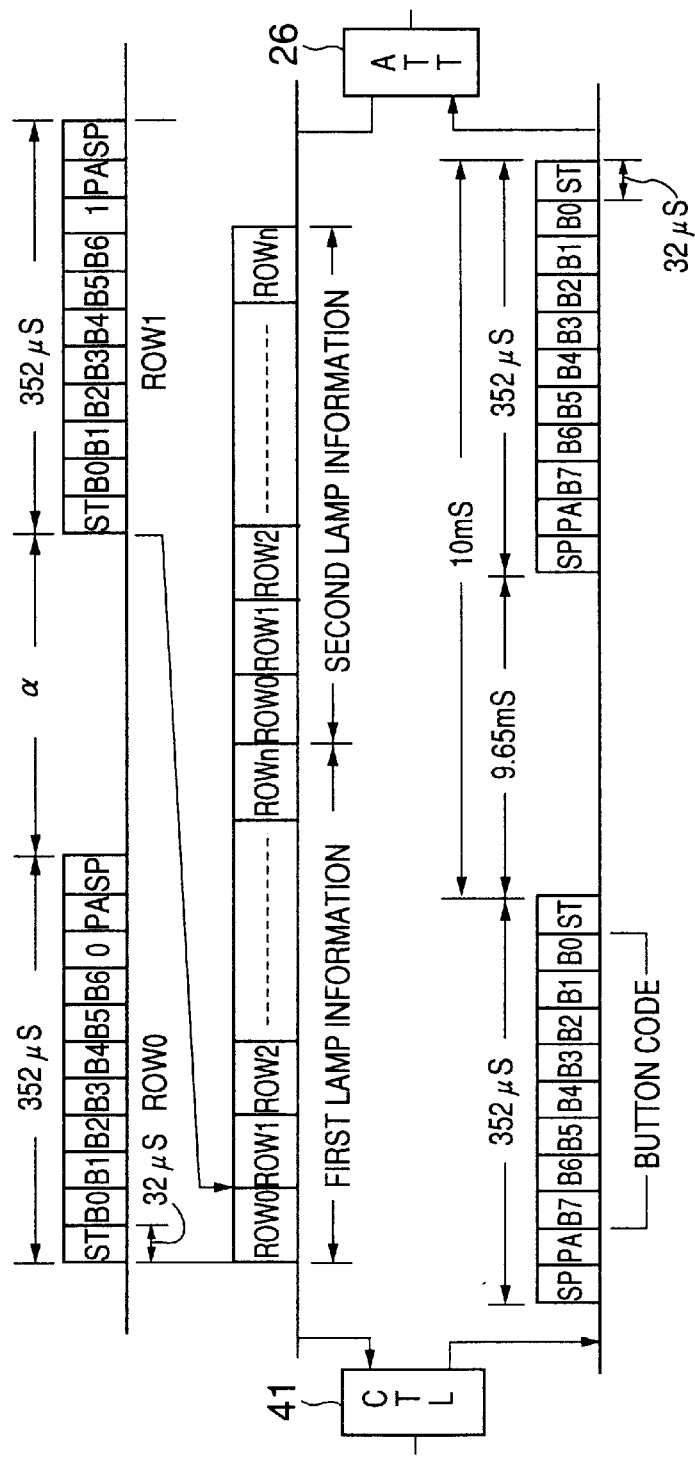
FIG. 4A shows a format of lamp information.
FIG. 4B shows a format of information data communication between CTL and ATT according to the related art.

When there is call incoming from the emergency report line, FPI 23 detects the call incoming, whereupon lamp display of the call incoming is given at the call incoming button of the reception console operation unit $55_1$ via NSW 22-POS 29-CTL $41_1$-CBA $42_1$-SDA $45_1$. Transfer of call incoming information and the like between POS 29 and CTL 41 occurs in the form of telegraphic messages or in the lamp/button interface format shown in FIGS. 4A and 4B. Although not illustrated, the lamp display control as described above is similarly performed in the rest of the reception consoles.

FPI 23 turns ON a call incoming bit of the emergency report line state (1) located at ROW00 in the FPI information area illustrated in FIG. 15, in order to cause the reception console 40 to display the status information of the emergency report line. The information is sent from FPI 23 to VSC 30 via LIB 37. Information data from all apparatuses are subject to a logical sum operation by LOR 35 of VSC 30 and the resultant sum is sent to all the apparatuses again. The reception consoles #1, #2 and the like continually monitor (SCAN) the emergency report line status (1) given in the FPI information area. When it is detected that the call incoming bit supplied from FPI 23 is turned ON, the reception consoles #1, #2 and the like cause LSDISP 51 to display the call incoming from the emergency report line.

In this case, the reception console in which the reception button is pressed first can responds to the call incoming. For example, when the call incoming reply button of the operation unit of the reception console #1 is pressed, a call path is formed via POS 29-NSW 22-FPI 23 similarly to the related art, so that a call can proceed between the reporter and the manipulator of reception console #1. When the call ends, the restoration button of the reception console operation unit is depressed, so that the subscriber is disconnected and the emergency report line is restored.

FPI 23 turns ON the "unused" bit (ROW00 in the FPI information area shown in FIG. 15) indicating that the emergency report line status is unused. The information is sent from FPI 23 to VSC 30 via LIB 37. LOR 35 of VSC 30 produces a logical sum of the information data from all apparatuses. The resultant sum is sent to all apparatuses again. As a result of this, the reception consoles #1, #2 and the like gives a display indicating that the emergency report line is unused.

Figure 20:
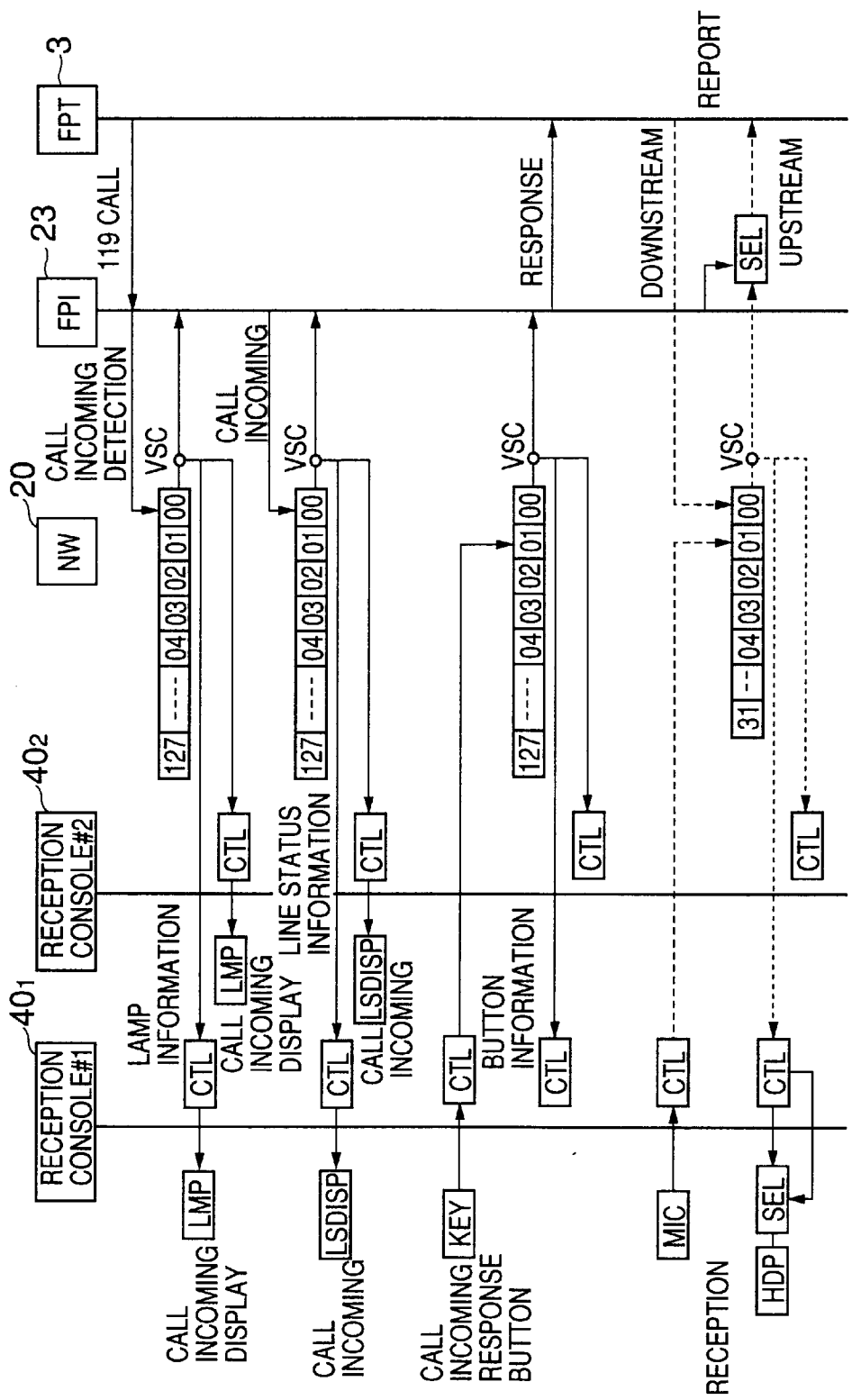
FIG. 20 shows a 119 call reception operation according to the invention.

FIG. 20 shows a 119 call reception operation according to the invention, wherein VSC 30 performs call connection between FPI 23 and the reception console 40.

Call incoming of a 119 call from the emergency report line is detected by FPI 23. The detection information is distributed between the reception consoles #1, #2 and the like via VSC 30, and associated lamp display is given all at once at the call incoming button of each reception console operation unit. FPI 23 turns ON the call incoming bit of the emergency report line status (1) at ROW00 in the FPI information area shown in FIG. 15, so that the information bit is distributed between all apparatuses via VSC30. As a result, the call incoming from the emergency report line is displayed at LSDISP 51 of each of the reception consoles #1, #2 etc.

The reception console in which the reception button is pressed first responds to the call incoming. For example, when the reception button of the operation unit is depressed at the reception console #1, the associated information is distributed to all apparatuses via VSC30 and is read by FPI 23. Based on this, the reception console #1 controls SEL 56 by firmware control so as to retrieve sound data from FPI 23 (TS00). FPI 23 controls SEL56 so as to retrieve sound data from the reception console #1 (TS01). In this way, a call path is formed between the reception console #1 and FPI 23.

Figure 21:
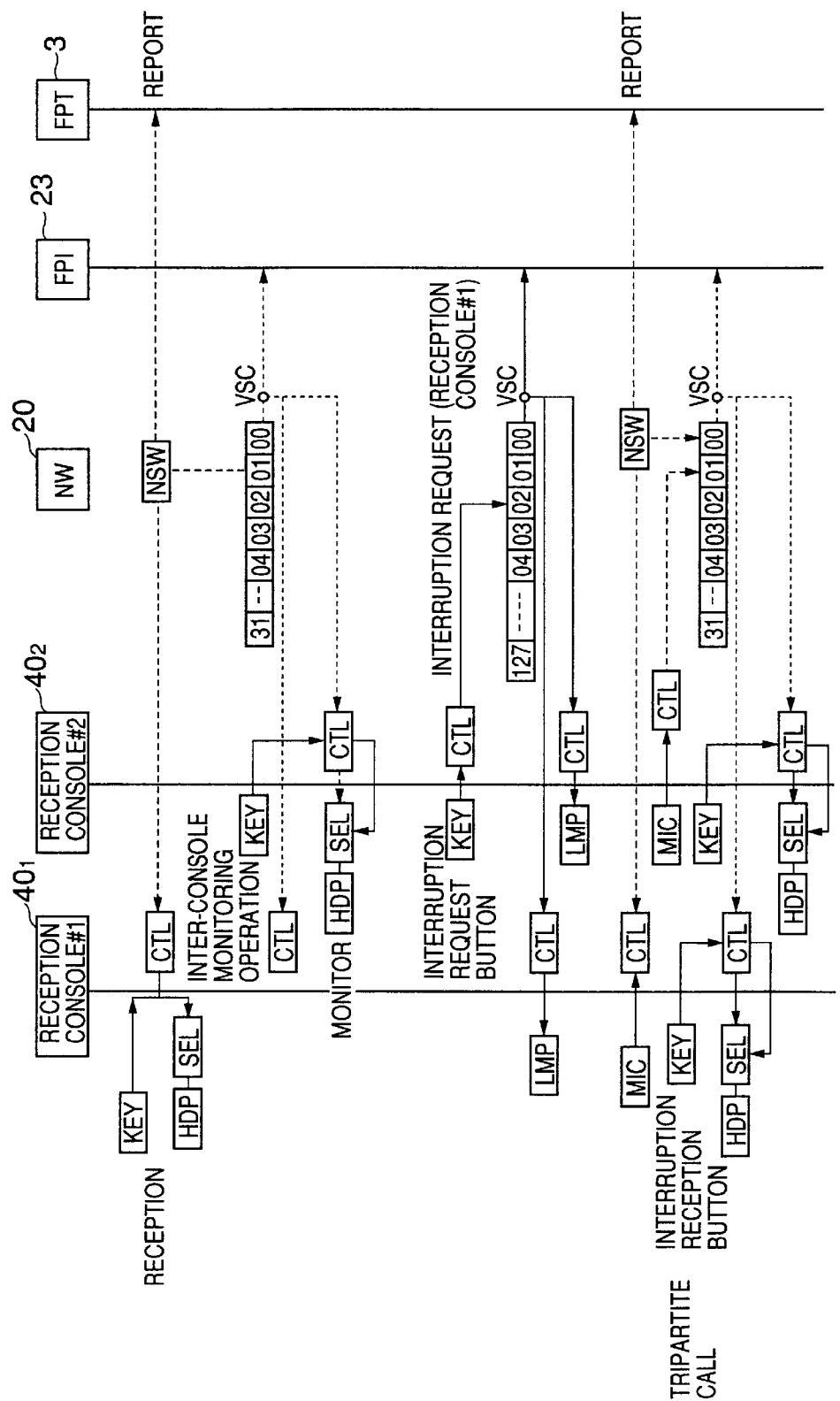
FIG. 21 illustrates an inter-console monitoring/interruption operation according to the invention.

FIG. 21 illustrates an inter-console monitoring/interruption operation according to the invention.

It is assumed that, while the reception console #1 is receiving an emergency report (while the manipulator or operator of the reception console 1 is replying to call incoming from the emergency report line and is being engaged in a call), the reception console #2 performs inter-console monitoring and interruption with respect the call.

When a call line is formed between the reception console #1 and a subscriber, call sound of both parties is always input to VSC 30 via CTL 41-POS 29-NSW 22-CFT 31. For example, the sound data of the subscriber from FPI 23 is added (synthesized) to the upstream sound data of the manipulator at CTL 41 of the reception console #1. VSC 30 subjects sound data from the apparatuses to time division multiplexing and distributes the multiplex data to the apparatuses.

It is assumed that the inter-console monitoring operation with respect to the reception console #1 is performed by the reception console #2 in this state, By controlling SEL 56 of the reception console #2 under the firmware control of CTL $41_2$, and by selecting sound data from the reception console #1, the call sound of the reception console #1 can be monitored by the manipulator of the reception console #2.

When the interruption button of the operation unit of the reception console #2 is depressed in this state, the TS02 interruption request bit of the reception console information area of FIG. 16 corresponding to the reception console #2 is turned ON, under the firmware control of the reception console #2. Each of the bits in the interruption request pattern in FIG. 16 corresponds to a respective connection destination reception console. The information is subject to logical sum and reproduced via VSC 30 and distributed between all apparatuses. The reception console #1 monitors TS02 of the reception console information area of the reception console #2, and recognizes that the reception console #2 performed interruption operation by detecting that the interruption request bit addressed to the reception console #1 is ON. Because sound data of the reception console #2 is input to the reception console #1, the sound of the reception console #2 is imported by firmware control of SEL 56 of the reception console #1. Thus, interruption facilities is realized.

Figure 22:
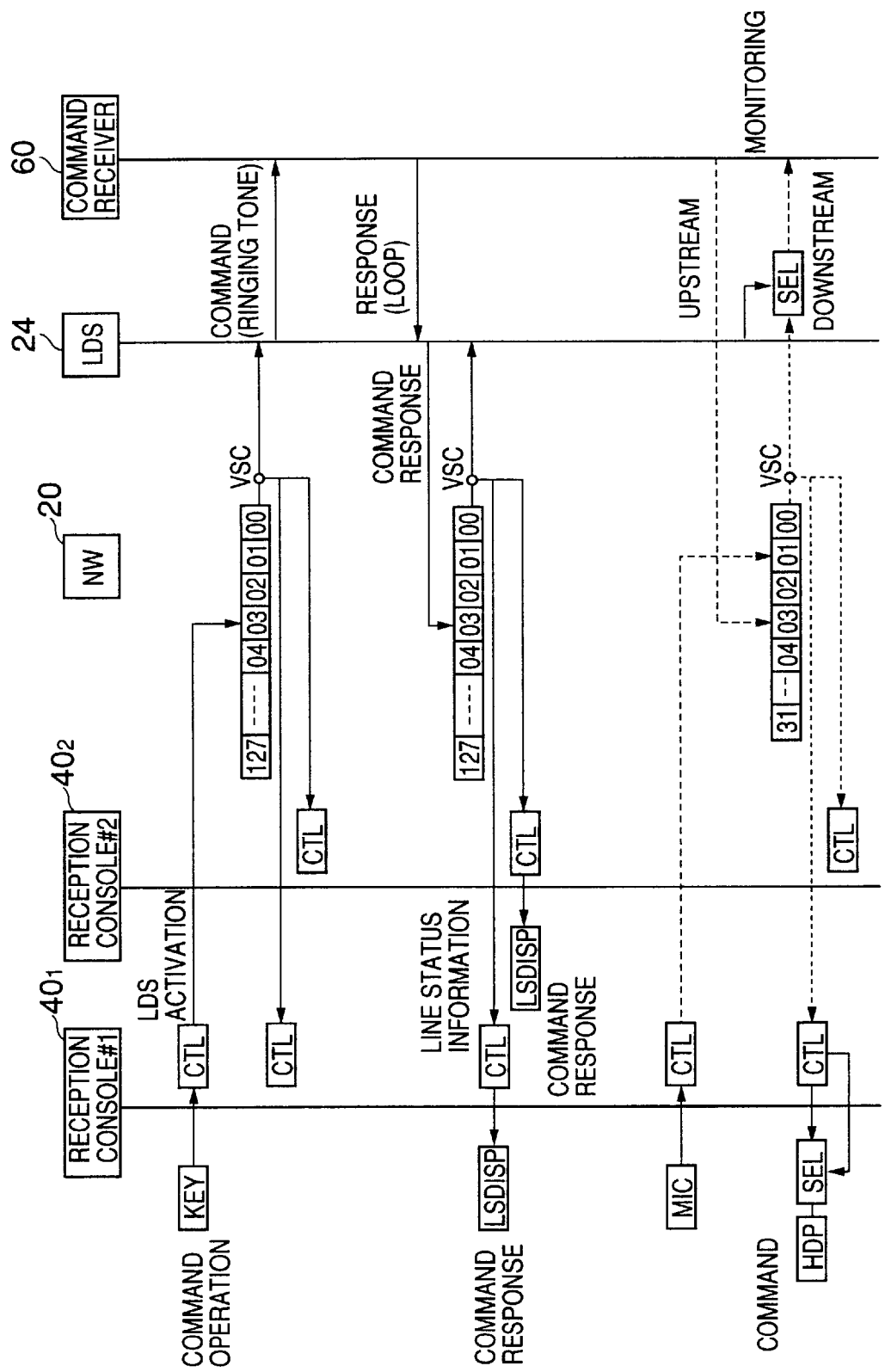
FIG. 22 illustrates a station command operation according to the invention.

FIG. 22 illustrates a station command operation according to the invention.

A description will be given of a case wherein the command receiver apparatus $60_1$ receives a command from the reception console #1. When a command origination operation with respect to the command receiver apparatus $60_1$ is performed at the operation unit of the reception console #1, CTL $40_1$ of the reception console #1 recognizes the command origination operation via SCA $46_1$-CBA $42_1$, and the LDS activation bit (1) of the LDS information area (TS03)-ROW12-BIT0 of FIG. 17 is turned ON. The information is subject to logical sum and reproduced via VSC 30, and is distributed to apparatuses.

Based on this activation information, LDS 24 activates the command receiver apparatus $60_1$.

Figure 5:
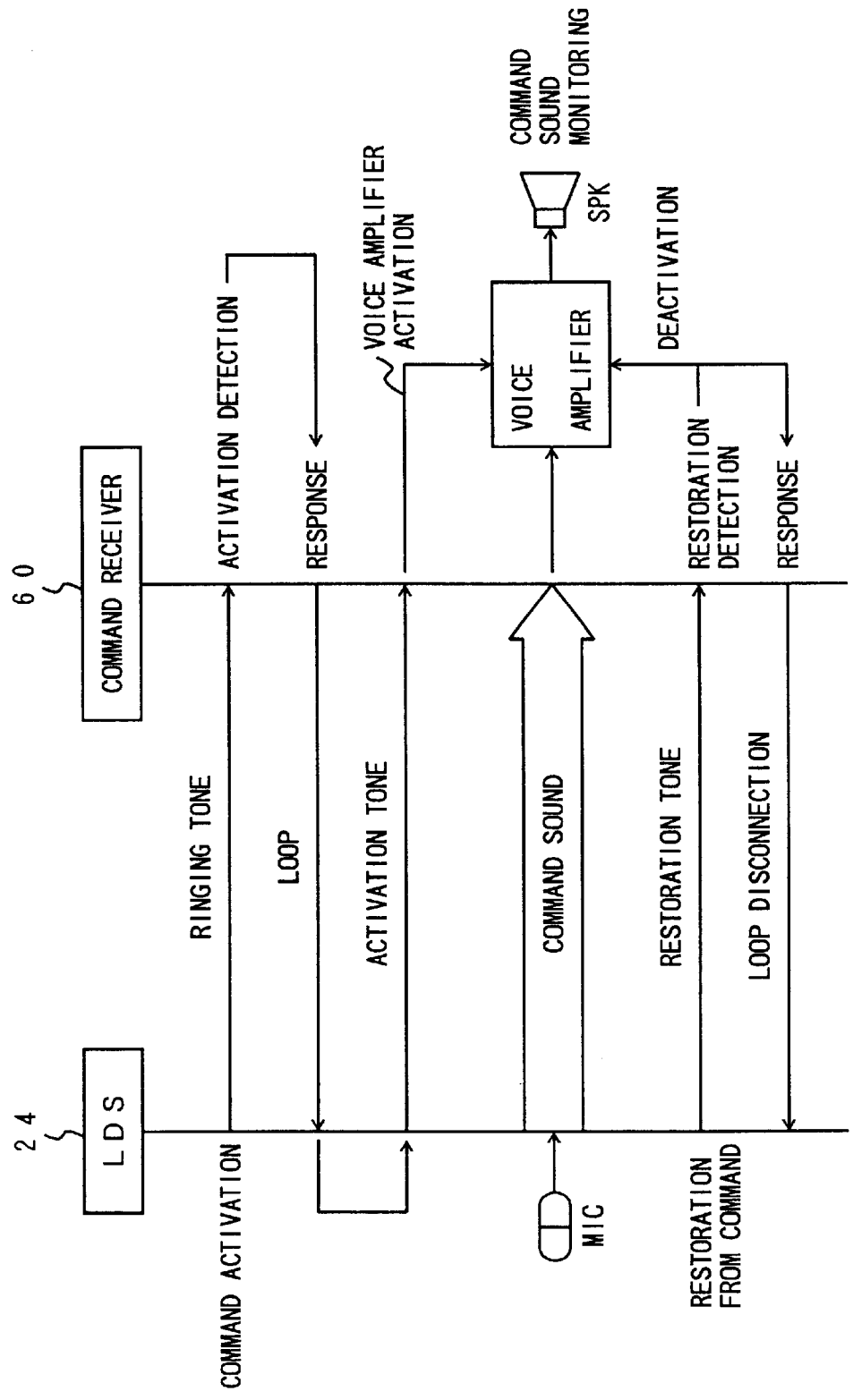
FIG. 5 shows a communication protocol of a command line according to the related art.
Figure 6:
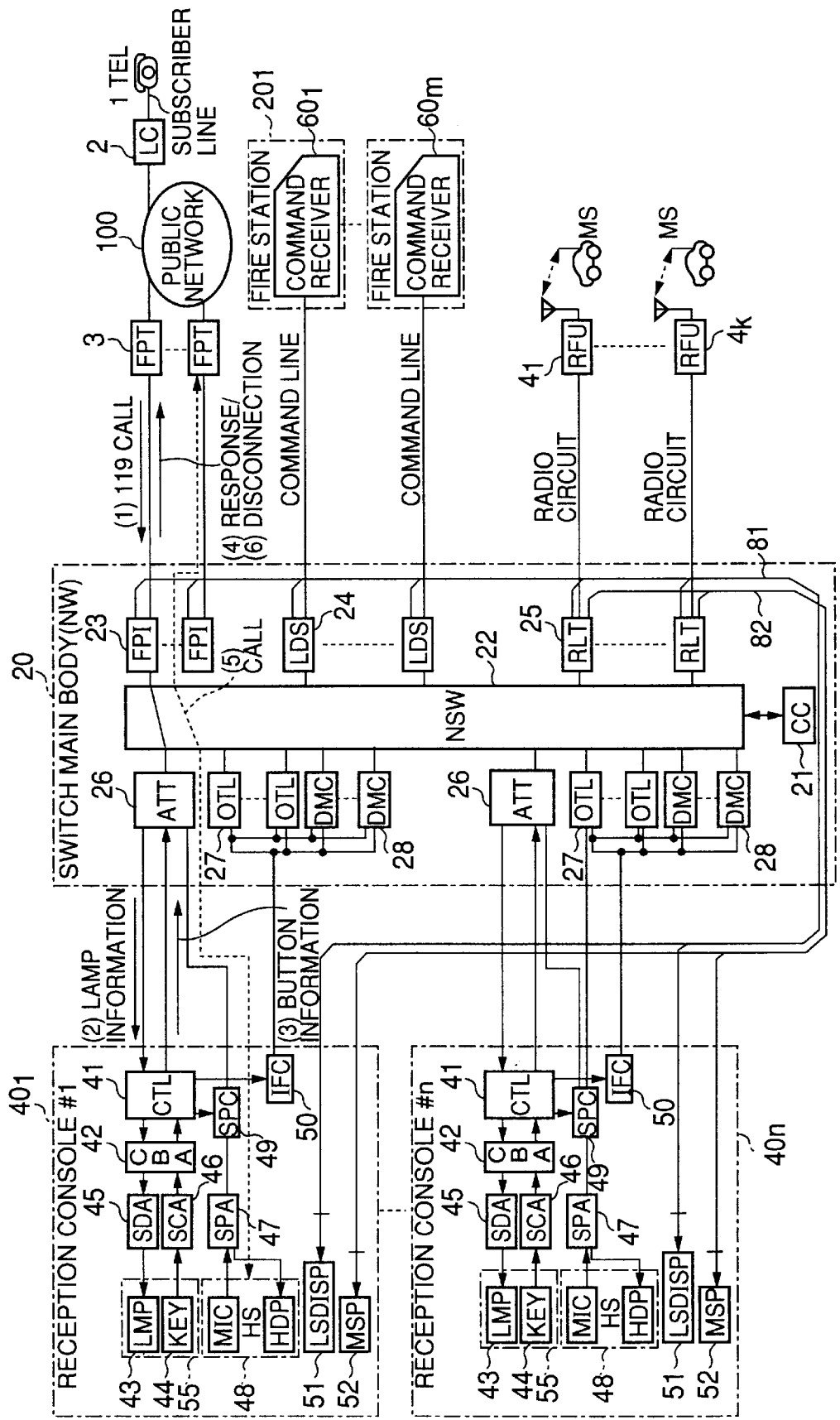
FIG. 6 shows a 119 call reception operation according to the related art.
Figure 7:
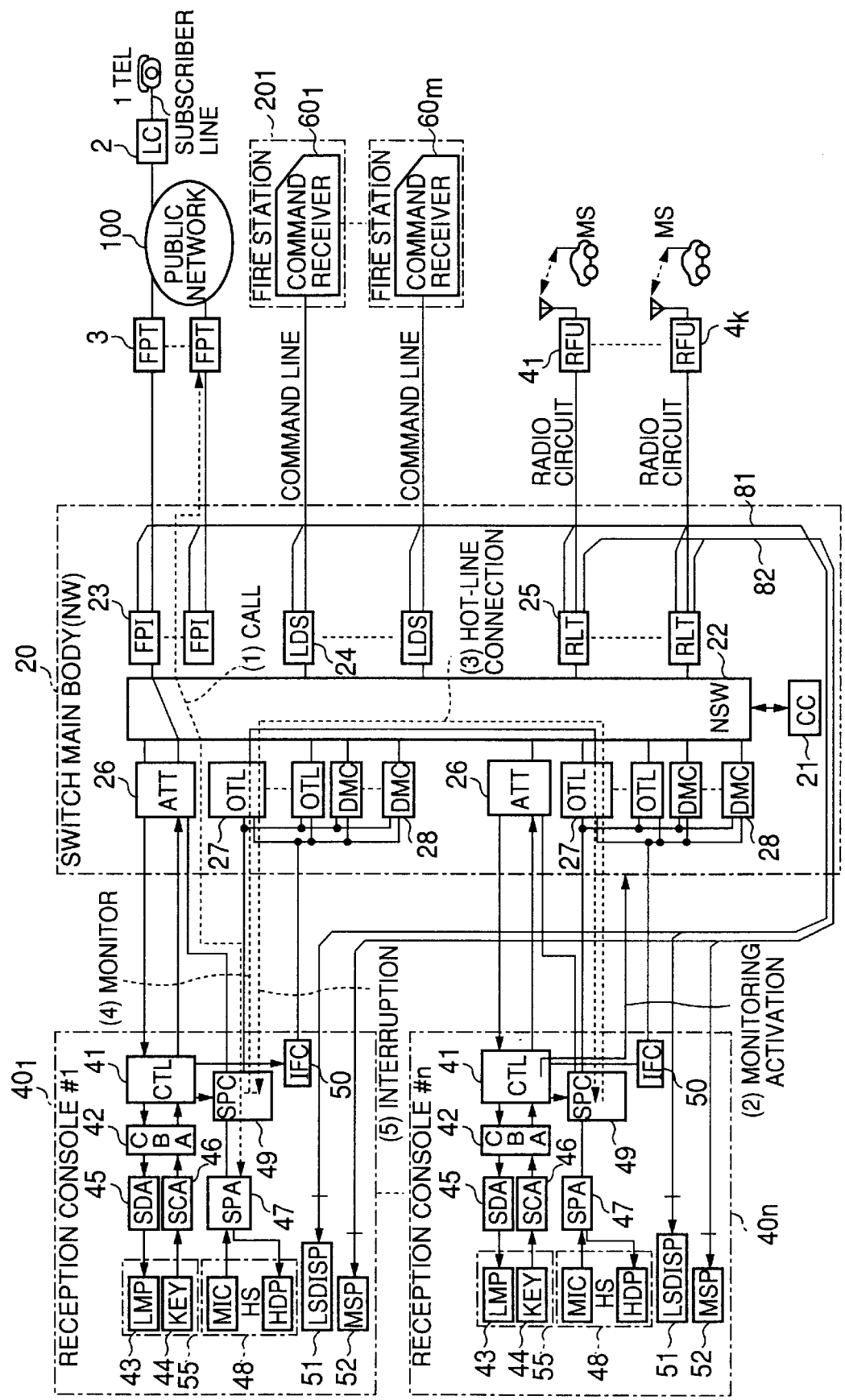
FIG. 7 shows an inter-console monitoring/interruption operation according to the related art.
Figure 8:
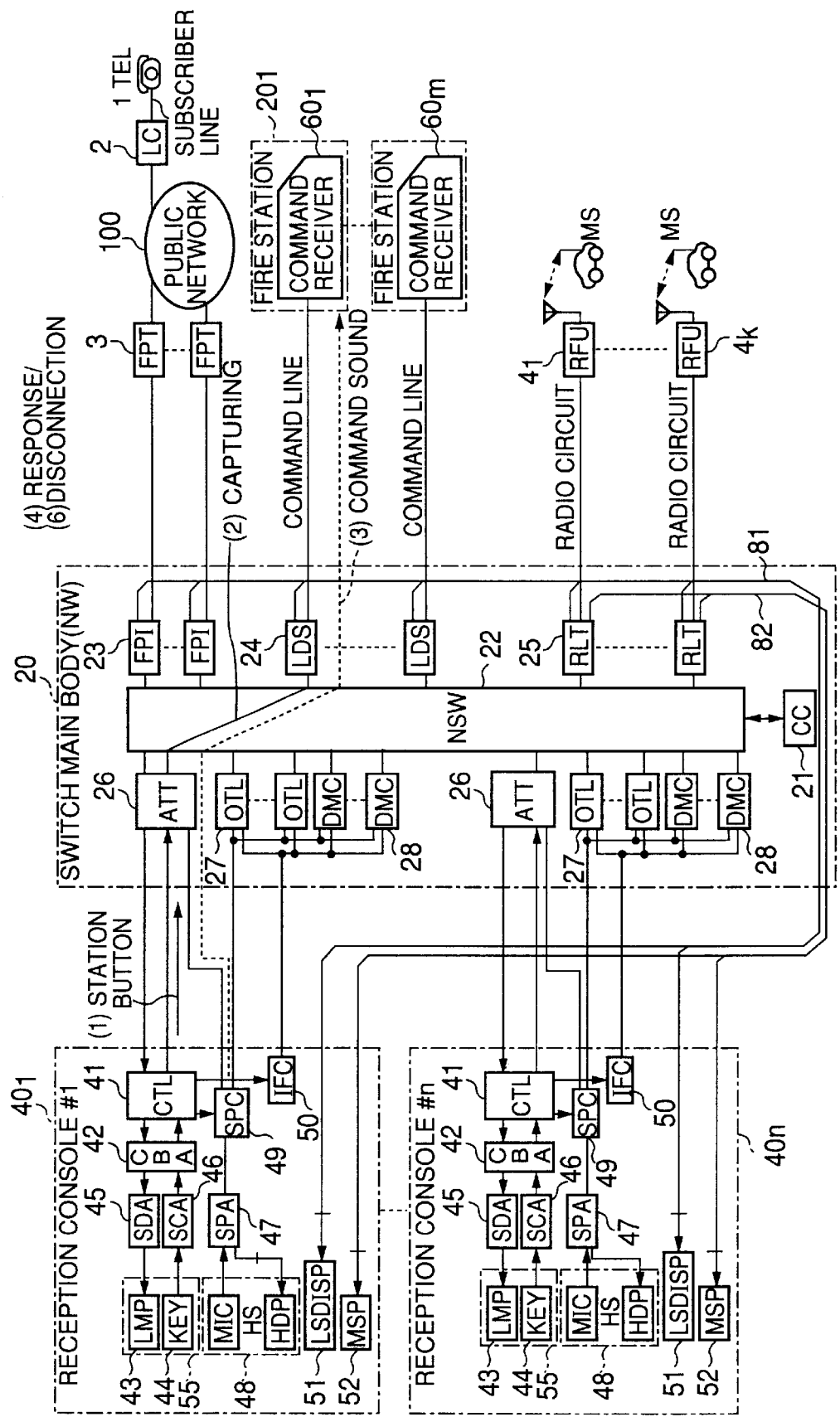
FIG. 8 shows a station command operation according to the related art.
Figure 9:
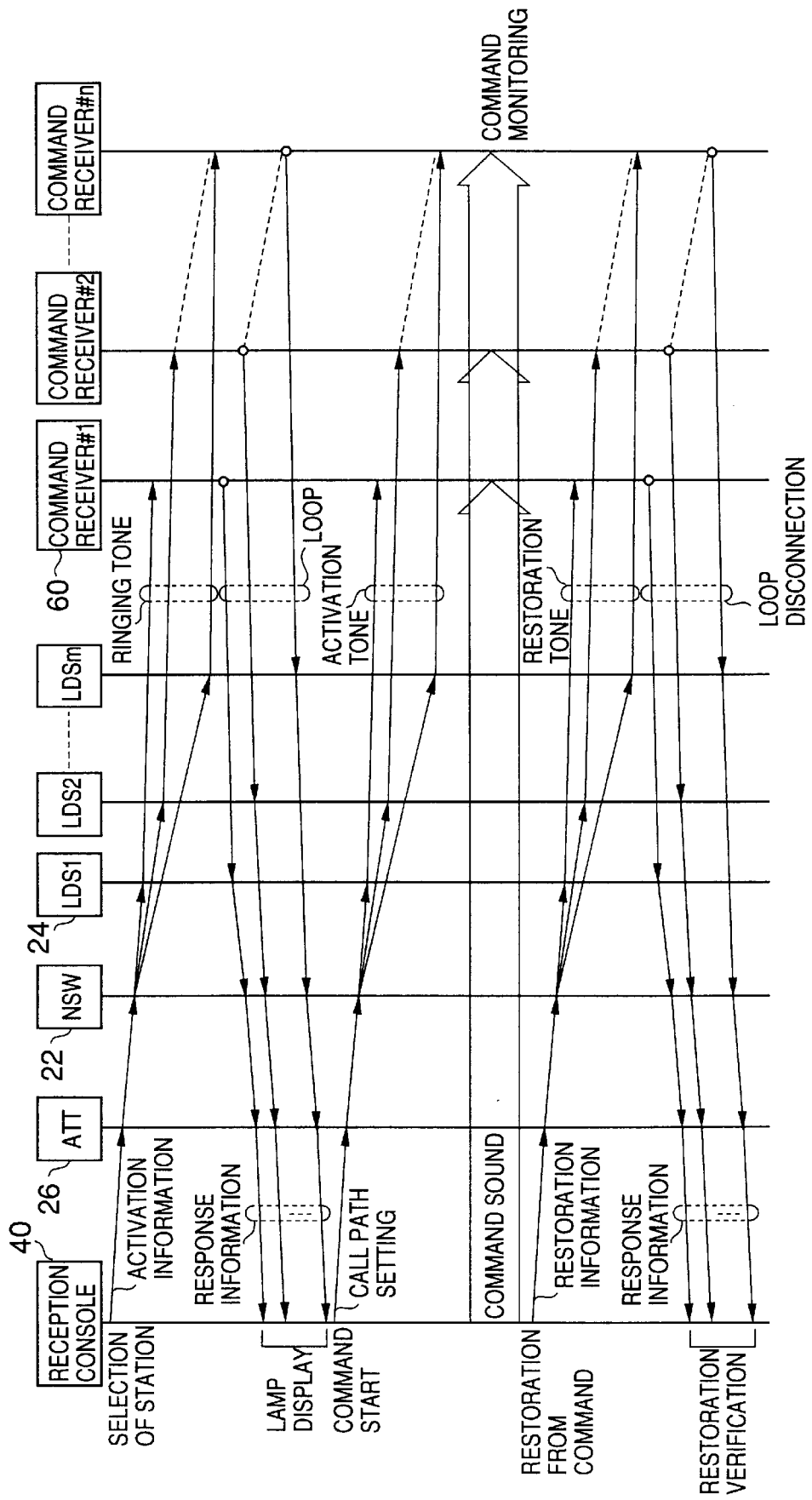
FIG. 9 illustrates a station command sequence of the emergency reporting system according to the related art.
Figure 10:
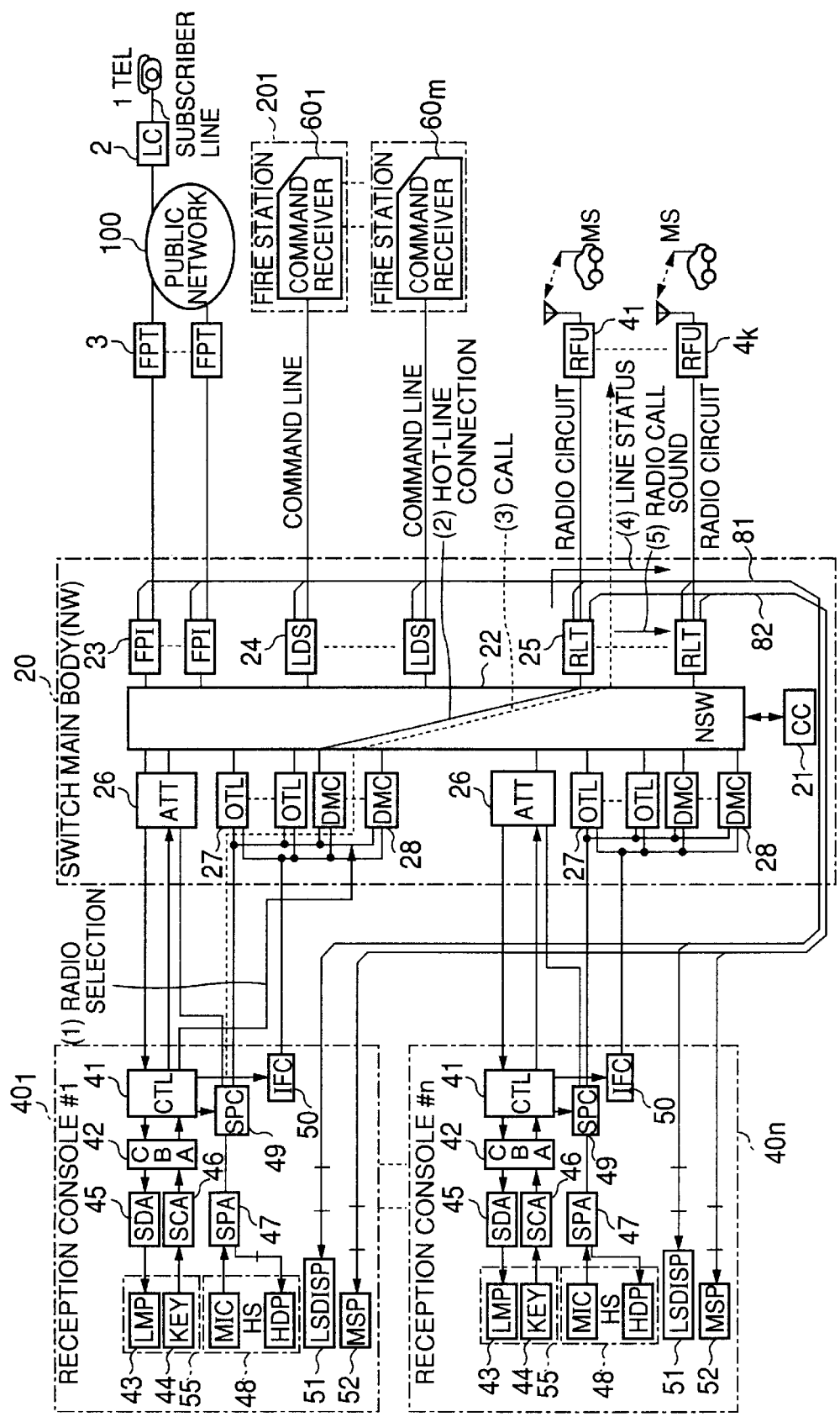
FIG. 10 shows a radio communication operation according to the related art.
Figure 12A:
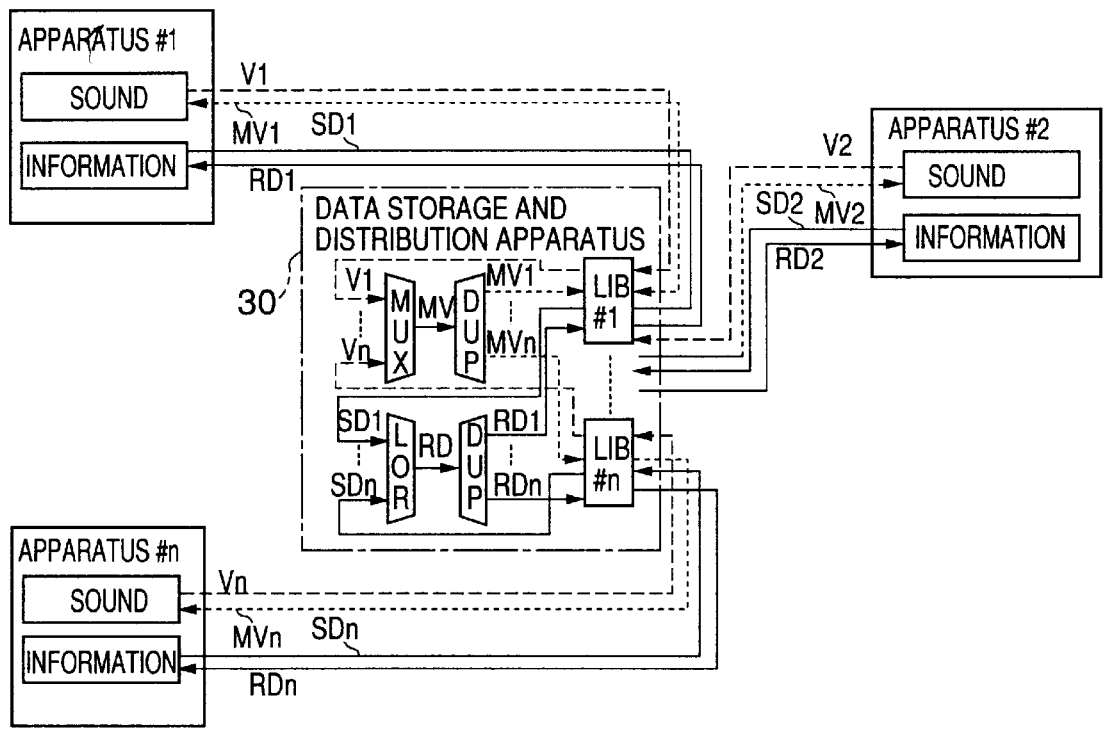
FIGS. 12A, 12B and 12C illustrate operating principles of the present invention.
Figure 12B:
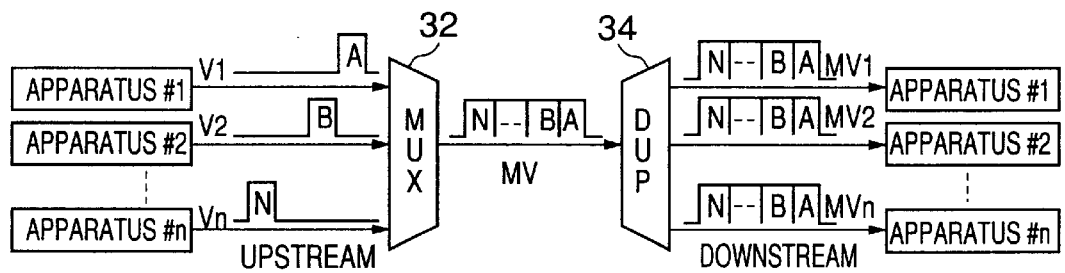
Figure 12C:
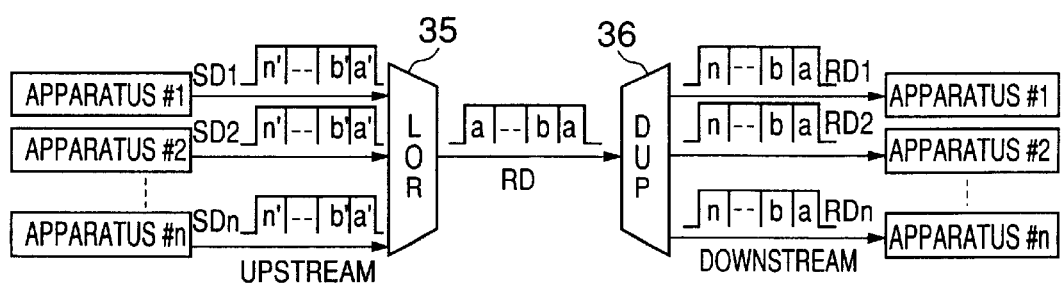

The command receiver apparatus $60_1$ gives a reply (loop) according to the command line communication protocol shown in FIG. 5. A reply to the command is detected by LDS 24, and a reply to the command bit is written in a line status notification block (4) of the LDS information area (TS03) (4). The information is distributed to all apparatuses via VSC 30, so that the reply to the command by the command receiver apparatus $60_1$ is displayed on LSDISP 51 of the reception console #1. The information is of course displayed on LSDISP 51 of the reception console #2, but is an object of monitoring only.

The manipulator of the reception console #1 acknowledges the display indicating the reply, and performs a necessary operation to start processing the command, so that a call path is formed between the reception console #1 and LDS 24. When the manipulator gives a command sound, the command sound data is input to VSC 30 via SPA 471-CTL $40_1$-POS 29-NSW 22-CFT 31, so that it is retrieved by LDS 24 and heard by a command receiver. A command can be simultaneously originated to plural selected command receiver apparatuses $60_1$–$60_m$.

Figure 23:
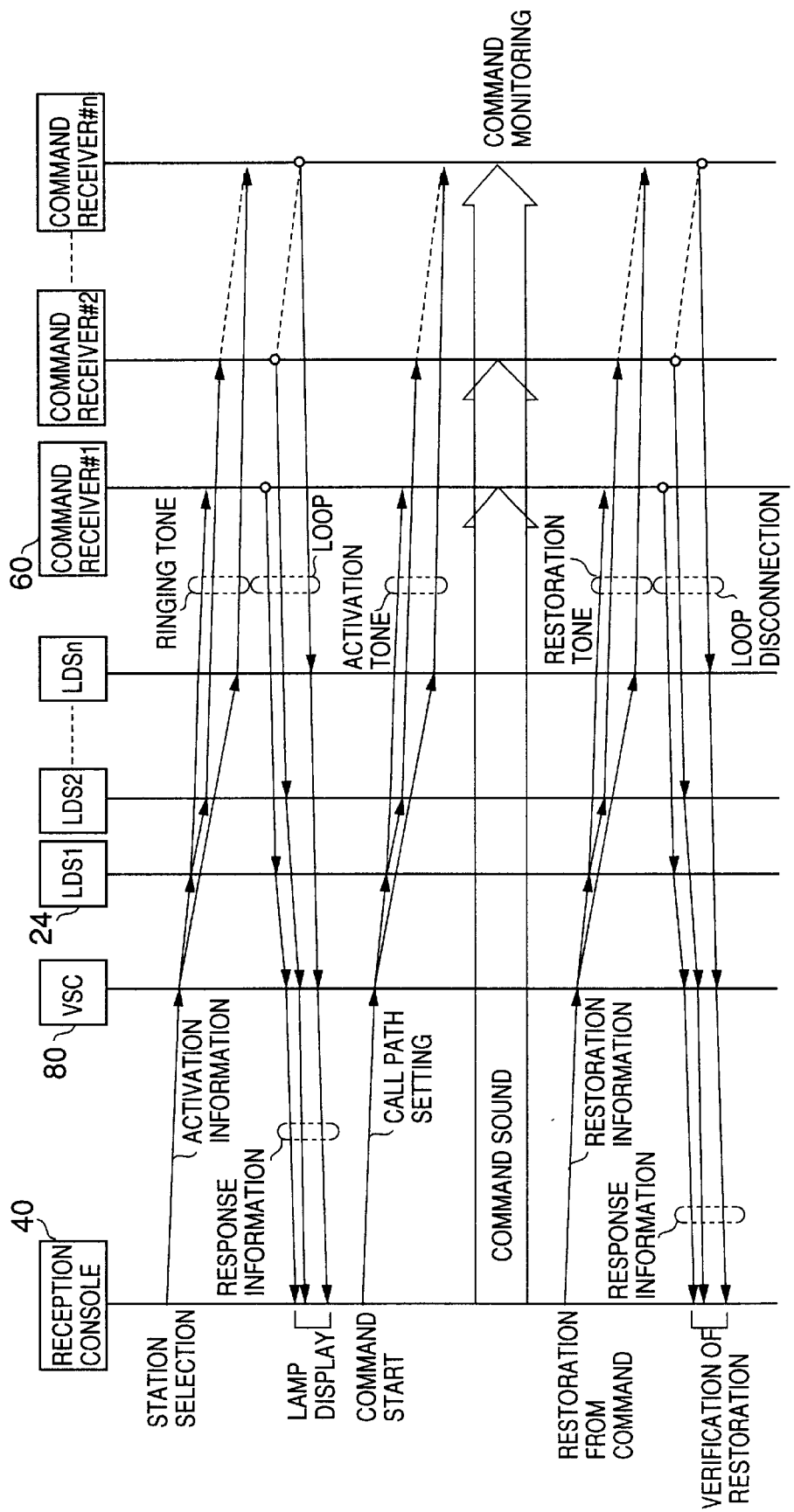
FIG. 23 illustrates a station command sequence of the emergency reporting system according to the invention.

FIG. 23 illustrates a station command sequence of the emergency reporting system according to the invention. Since the LDS activation bit (1) from the reception console #1 is instantly delivered to each of LDS 24l–24m according to the system of the invention, connect time for all command lines is largely reduced. When a command is originated to 100 stations simultaneously, connect time for each station is 400 ms according to the system of the related art. According to the system of the invention, connect time is 32 ms, which is 1/10 of the connect time of the related art, due to transmission delay caused by VSC 30. Connect time according to the invention does not vary depending on the number of terminals at the stations.

Figure 24:
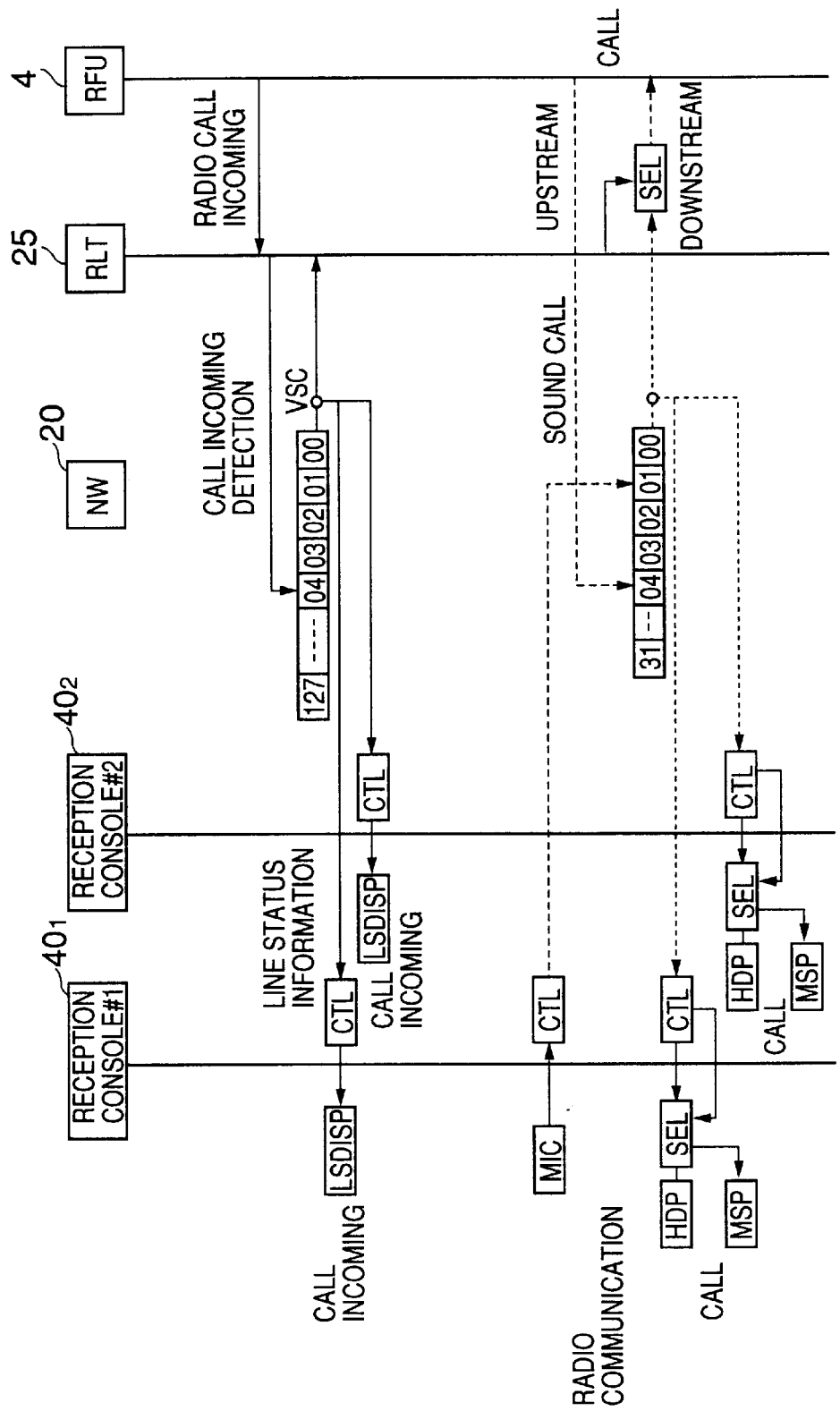
FIG. 24 illustrates a radio call operation according to the invention.

FIG. 24 illustrates a radio call operation according to the invention. Call incoming from a radio apparatus is processed such that call incoming display is given at LSDISP 51 of each reception console and a call sound from a radio apparatus is given (a sound from the radio apparatus is heard through MSP 52 of the reception console operation unit). When RLT 25 recognizes call incoming from the radio circuit, the call incoming bit (3) in the RLT information area (TS04)-ROW00-BIT2 shown FIG. 18 is turned ON. This information is distributed to all apparatuses via VSC 30, and call incoming display is given on LSDISP 51 of each of the reception consoles #1, #2 and the like.

Radio call sound from the radio apparatus is multiplexed and distributed via RLT 25-NSW 22-CFT 31-VSC 30, and retrieved via SEL 56 under the firmware control at the reception consoles #1, #2 and the like. In this way, the radio call sound is heard through MSP 52. For example, when an operation for replying to call incoming is performed at the reception console #1, a call path is formed between the reception console #1 and RLT 25, so that radio communication becomes possible between a manipulator operator and a radio-equipped vehicle. Although not illustrated, various signals which control sound and radio apparatuses in radio communication (press signal, squelch signal, radio activation signal) are all exchanged via VSC30.

FIGS. 25A and 25B illustrate system capacity of the emergency report system according to the invention.

FIG. 25A shows how a switch (equivalent of E3150D from Fujitsu) is implemented according to the invention. As a result of being able to eliminate OTL 27, DMC 28 and the like, the system can be implemented by a 4-rack, 2-NW construction even when a total of 14 reception consoles are mounted, resulting in a total of 15 LT units mounted. This is about 60% of the system capacity of the system of the related art.

FIG. 25B shows the number of MDF cables according to the invention. As a result of elimination of the metallic information line 81, the sound line 82, in addition to the elimination of OTL 27 and DMC 28, the number of MDF cables, each being equivalent to 50 pins, required in the system of the invention is 250, which is about ⅓ of the number required in the related art. Accordingly, the system installation work, which affects the time required for delivery more than anything else, can be significantly reduced by reducing the number of MDF terminals.

While the description above is given on an assumption that the present invention is applied to an emergency report system, the present invention may also be applied to any data communication system in which data communication is performed between a plurality of terminal apparatuses.

What is claimed is:

1. A data communication system comprising:
    a data storage and distribution apparatus; and
    a plurality of terminal apparatuses, each of which is connected to and periodically transmits data to said data storage and distribution apparatus, the transmission of data being achieved by transmitting a frame including a plurality of time slots fixedly allocated to the respective terminal apparatuses and by conveying the data in a corresponding one of the time slots,
    wherein said data storage and distribution apparatus receives frames from said plurality of terminal apparatuses, and obtains a logical sum of the frames by maintaining bit-to-bit correspondences between the frames aligned along a time axis so as to produce a logical sum frame and to supply the logical sum frame to each of said terminal apparatuses, said terminal apparatuses retrieving data of one or more time slots from the received logical sum frame, and
    said plurality of terminal apparatuses each transmit sound data periodically to said data storage and distribution apparatus, and said data storage and distribution apparatus produces a sound data frame including a plurality of time slots by allocating the sound data of each terminal apparatus to a corresponding one of the time slots, and supplies the sound data frame to each of said terminal apparatuses, said terminal apparatuses retrieving data of one or more time slots from the received sound data frame, and
    wherein each of said terminal apparatuses includes
        an emergency report trunk apparatus for connecting to an emergency report line of a public network;
        a reception console apparatus for receiving an emergency report of a subscriber;
        a command line interface connected to a command receiver apparatus provided at locations including a fire station and a police station; and
        a radio circuit interface for connecting to a remote radio base station apparatus.

2. The data communication system as claimed in claim 1, further comprising a plurality of reception console apparatuses, wherein a first reception console of said plurality of reception consoles retrieves sound data exchanged between said emergency report reception trunk apparatus and a second reception console of said plurality of reception consoles.

3. The data communication system as claimed in claim 2, wherein sound data from said first reception console is retrieved by at least one of said emergency report reception trunk apparatus and said second reception console.

4. The data communication system as claimed in claim 1, further comprising a plurality of reception consoles, wherein each of said plurality of reception consoles displays on a display unit information relating to an operating condition of at least one reception console apparatus, said information being included in multiplex received information data.

5. A data communication system, comprising:
   a data storage and distribution apparatus; and
   a plurality of terminal apparatuses, each of which is connected to and periodically transmits data to said data storage and distribution apparatus, the transmission of data being achieved by transmitting a frame including a plurality of time slots fixedly allocated to the respective terminal apparatuses and by conveying the data in a corresponding one of the time slots,
   wherein said data storage and distribution apparatus receives frames from said plurality of terminal apparatuses, and obtains a logical sum of the frames by maintaining bit-to-bit correspondences between the frames aligned along a time axis so as to produce a logical sum frame and to supply the logical sum frame to each of said terminal apparatuses, said terminal apparatuses retrieving data of one or more time slots from the received logical sum frame.

6. The data communication system as claimed in claim 5, wherein said plurality of terminal apparatuses each transmit sound data periodically to said data storage and distribution apparatus, and said data storage and distribution apparatus produces a sound data frame including a plurality of time slots by allocating the sound data of each terminal apparatus to a corresponding one of the time slots, and supplies the sound data frame to each of said terminal apparatuses, said terminal apparatuses retrieving data of one or more time slots from the received sound data frame.

7. A data storage and distribution apparatus connected to a plurality of terminal apparatuses, wherein said data storage and distribution apparatus receives frames from said plurality of terminal apparatuses, the frames each including a plurality of time slots fixedly allocated to the respective terminal apparatuses and conveying data in a corresponding one of the time slots, and obtains a logical sum of the frames by maintaining bit-to-bit correspondences between the frames aligned along a time axis so as to produce a logical sum frame and to supply the logical sum frame to each of said terminal apparatuses.

8. A data switching apparatus, comprising:
   an emergency report reception trunk apparatus configured to be connected to an emergency report line of a public network;
   a reception console interface configured to be connected to a reception console for receiving an emergency report;
   a command line interface configured to be connected to a command receiver apparatus provided at locations including a fire station and a police station;
   a radio circuit interface configured to be connected to a remote radio base station apparatus;
   a sound data storage and distribution apparatus receiving sound data periodically transmitted from a plurality of peripheral apparatuses including at least one of said emergency report reception trunk apparatus, said reception console, said command receiver apparatus, and said remote radio base station apparatus, producing a data frame including a plurality of time slots by allocating the sound data of each peripheral apparatus to a corresponding one of the time slots, and supplying the data frame to each of said peripheral apparatuses; and
   an information data storage and distribution apparatus receiving frames from said plurality of peripheral apparatuses, the frames each including a plurality of time slots allocated to the respective peripheral apparatuses and conveying information data in a corresponding one of the time slots, wherein said information data storage and distribution apparatus obtains a logical sum of the frames by maintaining bit-to-bit correspondences so as to produce a logical sum frame and to supply the logical sum frame to each of said peripheral apparatuses.

9. The data switching apparatus as claimed in claim 8, wherein each of said plurality of peripheral apparatuses periodically outputs the sound data to said sound data storage and distribution apparatus as the sound data is externally input, and retrieves data of one or more time slots from the data frame received from said sound data storage and distribution apparatus.

10. The data switching apparatus as claimed in claim 8, further comprising a line switching unit switch provided between said emergency report reception trunk apparatus and said reception console interface, said line switching unit notifying the reception console interface of arrival of an emergency call from the emergency report reception trunk apparatus, and capturing an unused line in accordance with a call transfer request from said reception console interface so as to transfer the emergency call to a call transfer destination.

* * * * *